US005519681A

United States Patent [19]

Maeda et al.

[11] Patent Number: 5,519,681

[45] Date of Patent: May 21, 1996

[54] RECORDING MEDIUM REPRODUCING APPARATUS THAT IDENTIFIES A CHANNEL OF REPRODUCED DATA

[75] Inventors: Yasuaki Maeda, Kanagawa; Hideki Nagashima; Kosuke Nakamura, both of Tokyo, all of Japan

[73] Assignee: Sony Corporation, Tokyo, Japan

[21] Appl. No.: 271,514

[22] Filed: Jul. 7, 1994

[30] Foreign Application Priority Data

Jul. 7, 1993 [JP] Japan .................................... 5-191853

[51] Int. Cl.$^{6}$ ........................................................ G11B 7/00

[52] U.S. Cl. ................................ 369/49; 369/48; 369/59; 369/60; 369/54; 360/53

[58] Field of Search ................................ 369/54, 47, 48, 369/49, 50, 58, 39, 60, 124, 32; 360/39, 51, 53, 29, 48

[56] References Cited

U.S. PATENT DOCUMENTS

| | | | |
|---|---|---|---|
| 4,392,162 | 7/1983 | Yamamoto | 360/10.3 |
| 5,412,628 | 5/1995 | Yamazaki et al. | 369/48 X |

FOREIGN PATENT DOCUMENTS

| | | | |
|---|---|---|---|
| EP-A-0260722 | 3/1988 | European Pat. Off. | G11B 21/10 |
| EP-A-308148 | 3/1989 | European Pat. Off. | G11B 20/10 |
| EP-A-0312406 | 4/1989 | European Pat. Off. | G11B 5/86 |
| EP-A-403224 | 12/1990 | European Pat. Off. | G11B 27/36 |

*Primary Examiner*—Georgia Y. Epps
*Assistant Examiner*—Muhammad N. Edun
*Attorney, Agent, or Firm*—Limbach & Limbach

[57] ABSTRACT

An optical disc reproducing apparatus including an optical head, memory, controller and decoder. The head intermittently reads digital data in at least two channels L, and R recorded on an optical disc. The memory temporarily stores digital data obtained by demodulating the output data of the optical head. The controller controls the reading operation of the optical head on the optical disc based on the amount of the digital data stored in the memory. The controller also controls an operation of writing data into the memory and an operation of reading data from the memory so that the digital data output by the optical head are written into the memory at a transfer rate which is higher than the transfer rate at which the digital signals stored in the memory are read out. The is supplied with the digital data for the two channels stored in the memory on a time-division basis. When data are supplied from the memory to the decoder, the controller supplies the decoder with a channel identification signal for identifying the channel with which the data received by the decoder is associated.

11 Claims, 18 Drawing Sheets

FIG. 3

| | | 16bit (MSB … LSB) | (MSB … LSB) | 16bit (MSB … LSB) | (MSB … LSB) | |
|---|---|---|---|---|---|---|
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | 00000000 | 00000000 | 3 |
| | | 00000000 | 00000000 | 00000000 | 00000000 | 4 |
| | | 00000000 | 00000000 | 00000000 | 00000000 | 5 |
| | | M | I | N | I | 6 |
| | | Disc type | Rec power | First TNO | Last TNO | 7 |
| | | READ-OUT START ADDRESS (ROA) | | | | 8 |
| | | POWER CAL AREA START ADDRESS (PCA) | | | 00000000 | 9 |
| | | U-TOC START ADDRESS (USTA) | | | 00000000 | 10 |
| | | RECORDABLE USER AREA START ADDRESS (RSTA) | | | 00000000 | 11 |
| DATA PORTION FOR SPECIFYING CORRESPONDING TABLE | | 00000000 | P-TN01 | P-TN02 | P-TN03 | 12 |
| | | P-TN04 | P-TN05 | P-TN06 | P-TN07 | 13 |
| | | … | … | … | … | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| MANAGEMENT TABLE PORTION (255 PART TABLES) | (01) | START ADDRESS | | | TRACK MODE | 78 |
| | | END ADDRESS | | | 00000000 | 79 |
| | (02) | START ADDRESS | | | TRACK MODE | 80 |
| | | END ADDRESS | | | 00000000 | 81 |
| | (03) | START ADDRESS | | | TRACK MODE | 82 |
| | | END ADDRESS | | | 00000000 | 83 |
| | | … | | | … | |
| | (FC) | START ADDRESS | | | TRACK MODE | 580 |
| | | END ADDRESS | | | 00000000 | 581 |
| | (FD) | START ADDRESS | | | TRACK MODE | 582 |
| | | END ADDRESS | | | 00000000 | 583 |
| | (FE) | START ADDRESS | | | TRACK MODE | 584 |
| | | END ADDRESS | | | 00000000 | 585 |
| | (FF) | START ADDRESS | | | TRACK MODE | 586 |
| | | END ADDRESS | | | 00000000 | 587 |

FIG. 4

| Portion | Part | 16bit (MSB … LSB) | (MSB … LSB) | 16bit (MSB … LSB) | (MSB … LSB) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | 00000000 | 00000000 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| DATA PORTION FOR SPECIFYING CORRESPONDING TABLE | | Disc | ID | P-DFA | P-EMPTY | 11 |
| DATA PORTION FOR SPECIFYING CORRESPONDING TABLE | | P-FRA | P-TN01 | P-TN02 | P-TN03 | 12 |
| DATA PORTION FOR SPECIFYING CORRESPONDING TABLE | | P-TN04 | P-TN05 | P-TN06 | P-TN07 | 13 |
| DATA PORTION FOR SPECIFYING CORRESPONDING TABLE | | P-TN0248 | P-TN0249 | P-TN0250 | P-TN0251 | 74 |
| DATA PORTION FOR SPECIFYING CORRESPONDING TABLE | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| MANAGEMENT TABLE PORTION (255 PART TABLES) | (01) | START ADDRESS | | | TRACK MODE | 78 |
| | | END ADDRESS | | | LINK INFO. | 79 |
| | (02) | START ADDRESS | | | TRACK MODE | 80 |
| | | END ADDRESS | | | LINK INFO. | 81 |
| | (03) | START ADDRESS | | | TRACK MODE | 82 |
| | | END ADDRESS | | | LINK INFO. | 83 |
| | (FC) | START ADDRESS | | | TRACK MODE | 580 |
| | | END ADDRESS | | | LINK INFO. | 581 |
| | (FD) | START ADDRESS | | | TRACK MODE | 582 |
| | | END ADDRESS | | | LINK INFO. | 583 |
| | (FE) | START ADDRESS | | | TRACK MODE | 584 |
| | | END ADDRESS | | | LINK INFO. | 585 |
| | (FF) | START ADDRESS | | | TRACK MODE | 586 |
| | | END ADDRESS | | | LINK INFO. | 587 |

FIG. 6

| | 16bit | | 16bit | |
|---|---|---|---|---|
| | MSB LSB | MSB LSB | MSB LSB | MSB LSB |
| 0 | sync | sync | sync | sync |
| 1 | sync | sync | sync | sync |
| 2 | sync | sync | sync | sync |
| 3 | clusterH | clusterL | sector | mode |
| 4 | 00000000 | 00000000 | 00000000 | 00000000 |
| 5 | Data0 | Data1 | Data2 | Data3 |
| 6 | Data4 | Data5 | Data6 | Data7 |
| 7 | Data8 | Data9 | Data10 | Data11 |
| | | | | |
| | | | | |
| | | | | |
| 57 | Data204 | Data205 | Data206 | Data207 |
| 58 | Data208 | Data209 | Data210 | Data211 |
| 59 | Data212 | Data213 | Data214 | Data215 |
| 60 | Data216 | Data217 | Data218 | Data219 |
| 61 | Data220 | Data221 | Data222 | Data223 |
| | | | | |
| | | | | |
| | | | | |
| 585 | Data2320 | Data2321 | Data2322 | Data2323 |
| 586 | Data2324 | Data2325 | Data2326 | Data2327 |
| 587 | Data2328 | Data2329 | Data2330 | Data2331 |

HEADER (rows 0–3)

SUB-DATA (row 4)

ONE SOUND FRAME (212 BYTES) (rows 5–58)

DATA AREA (2332 BYTES) (rows 5–587)

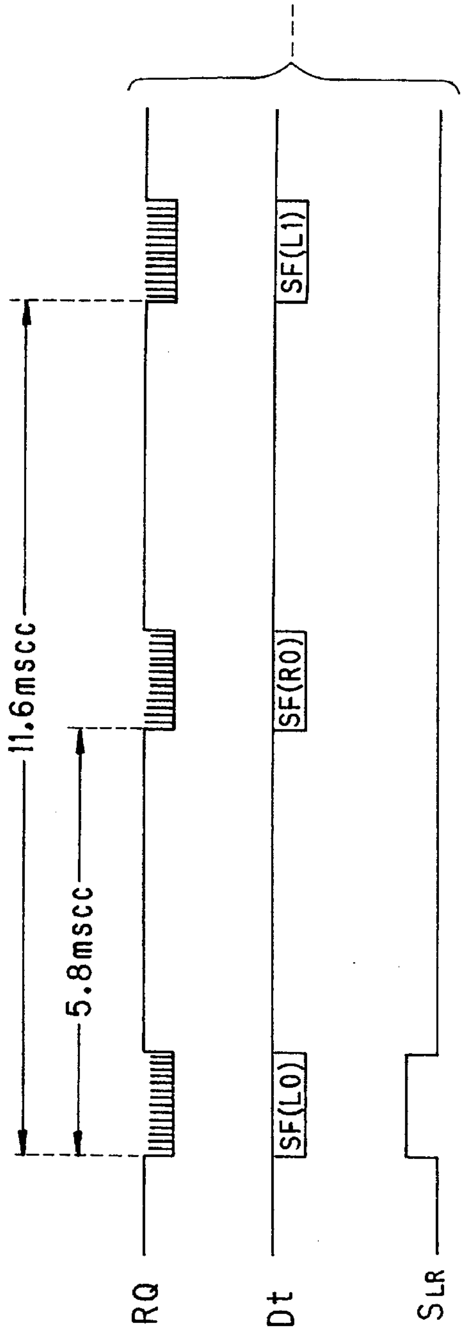
FIG. 13A-1
FIG. 13B-1
FIG. 13C-1
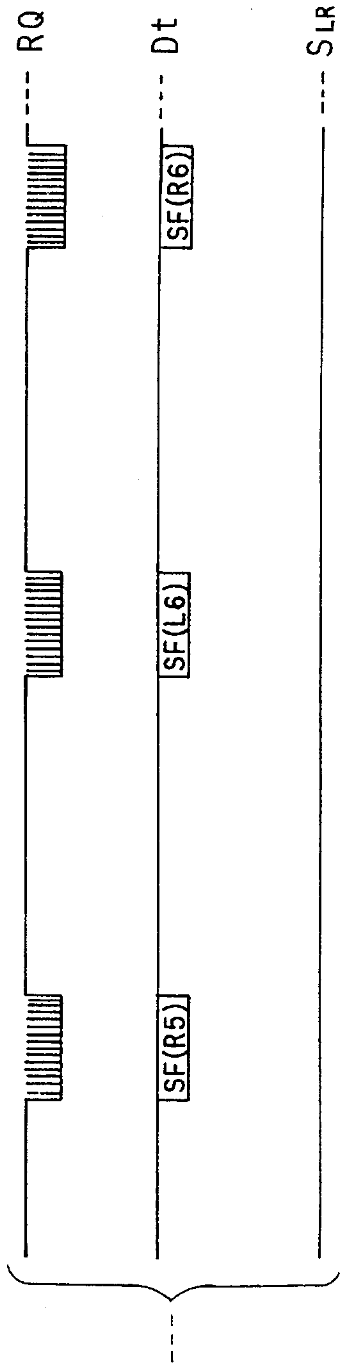
FIG. 13A-2
FIG. 13B-2
FIG. 13C-2

RECORDING MEDIUM REPRODUCING APPARATUS THAT IDENTIFIES A CHANNEL OF REPRODUCED DATA

BACKGROUND OF THE INVENTION

1. Field of the Invention

The present invention relates to recording media reproducing apparatus. More particularly, the present invention relates to a reproducing apparatus for recording media on which digital data in a plurality of channels are recorded.

2. Description of the Related Art

CD (compact disc) players are known as reproducing apparatus capable of reproducing music data and the like from an optical disc. There have been also proposed reproducing apparatuses utilizing a data-rewritable magneto-optical disc on which a user can record music data and the like.

In some reproducing apparatuses utilizing such disc media, the vibration-resisting function has been improved by the use of a buffer memory.

Specifically, during reproduction by such a reproducing apparatus, audio data read out from a disc are intermittently written in a buffer memory at a high transfer rate and are continuously read out from the buffer memory at a low transfer rate to be demodulated as audio reproduction signals. At this time, the buffer memory always keeps some data accumulated therein. Therefore, even if an external vibration or the like causes a track jump leading to a temporary interruption in the data readout from the disc, data can be continuously read out from the buffer memory. This allows the reproduction sounds from the reproducing apparatus to be output without interruption.

An example of a recording format used in such a reproducing apparatus will now be described with reference to the drawings.

As shown in FIG. 1A and FIG. 1B, a recording track on a magneto-optical disc has continuous clusters CL (=36 sectors) each including a subdata area having four sectors (one sector=2352 bytes) and a main data area having 32 sectors (SC0–SC30), one cluster constituting the minimum unit for recording. Such a cluster corresponds to two or three turns along the track. An address is recorded for each sector.

The subdata area consisting of four sectors is used for subdata or as a linking area and the like while TOC data, audio data and the like are recorded on the main data area consisting of 32 sectors.

A music data area recorded in a sector is subdivided into sound groups, and eleven sound groups constitute two sectors.

Specifically, the even sectors in FIG. 1B (SC0, SC2, SC4, etc.) are configured as shown in FIG. 1C while the odd sectors in FIG. 1B (SC1, SC3, SC5, etc.) are configured as shown in FIG. 1D.

As shown in FIGS. 1C and 1D, each sector has a header in which a synchronization pattern SYNC and an address AD are recorded at the beginning thereof followed by a subheader, and actual audio data are recorded following the subheader.

A sound frame SF containing 212 bytes constitutes the minimum data unit for recorded audio data, and eleven sound frames are included in every two sectors. One sound frame is data which are obtained by compressing audio signals for 11 msec in an L- or R-channel.

In an even sector, recording is performed alternately in the L- and R-channels, i.e., the recording is performed in a sound frame $SF_{(L0)}$ of the L-channel, a sound frame $SF_{(R0)}$ of the R-channel, a sound frame $SF_{(L1)}$ of the L-channel and so on up to a sound frame $SF_{(L5)}$ of the L-channel.

On the other hand, the alternate recording continues in an odd sector, i.e., the recording is performed in a sound frame $SF_{(R5)}$ of the R-channel, a sound frame $SF_{(L6)}$ of the L-channel, a sound frame $SF_{(L6)}$ of the R-channel and so on up to a sound frame $SF_{(R10)}$ of the R-channel.

A pair of sound frames of the L- and R-channels constitute one sound group (SG0–SG10). Therefore, the sound groups SG0–SG4 and the first half of the sound group SG5 are recorded in the even sector while the second half of the SG5 and the subsequent sound groups up to SG10 are recorded in the odd sector. Thus, the data for the eleven sound groups are recorded in the two sectors as described above.

When data recorded on a disc in such a format are recorded and reproduced through the buffer memory, the buffer memory performs storage on a sector basis. Specifically, access addresses are generated by combining the addresses of sectors and the byte addresses in the sectors (0–2351 bytes) to allow data writing and reading.

Data temporarily stored in the buffer memory are read out again on a sector basis to be supplied to a decoder provided downstream thereof which performs, for example, a process of decoding the audio-compressed data to obtain output as reproduction signals in two channels, i.e., L- and R-channels. As apparent from the above-described sector format, transfer of the data in an even sector to the decoder is sequentially performed starting with data in the L-channel (i.e., sound frame $SF_{(L0)}$) while transfer of the data in an odd sector to the decoder is sequentially performed starting with data in the R-channel (i.e., sound frame $SF_{(R5)}$). In other words, the data transfers for the L- and R-channels take place in reverse ways between an even sector and an odd sector.

When each sector is written in and read out from the buffer memory in the correct order and the read data are transferred to the decoder, the transfers of data in L- and R-channels alternately take place without fail when viewed on a sound frame basis, which creates no problem. Specifically, the decoder performs a decoding process for each of the sound frames thus fetched to expand the compressed data to obtain audio data for 11.6 msec and outputs the data alternately as L-channel data and R-channel data. Therefore, if the sound frames of the L- and R-channels are properly alternately supplied, the sound frames of the L- and R-channels can be directly output as audio data in the L- and R-channels, respectively.

However, in the event that transfer of the data in an even sector is followed by transfer of the data in another even sector due to an error during fetch or readout of sector data at the buffer memory or an error in the transfer process, a transfer error occurs, wherein data in the L-channel are consecutively transferred.

If the alternate transfer of sound frames in the L- and R-channels can not be maintained any more in such a situation, the decoder will output decode data on the data of the sound frames in the L-channel as audio data in the R-channel and will output decode data on the data of the sound frames in the R-channel as audio data in the L-channel conversely.

Thus, reversal of L- and R-phases occurs in the reproduced sound, which causes the so-called phase shifts in stereo sounds.

SUMMARY OF THE INVENTION

It is therefore an object of the present invention to provide a recording media reproducing apparatus which resolves the above-mentioned problem.

It is another object of the present invention to provide a reproducing apparatus for disc-shaped recording media.

According to the present invention, there is provided a recording media reproducing apparatus including a reading unit, a memory unit and a decode unit. The reading unit reads data in a plurality of channels recorded on a recording medium. In the memory unit, data output by the reading unit are temporarily stored. The decode unit is supplied with data in each of the plurality of channels stored in the memory unit on a time-division basis. When data are supplied from the memory unit to the decode unit, the decode unit is supplied with a channel identification signal for identifying the channel associated with the data received by the decode unit.

According to the present invention, there is provided a reproducing apparatus for disc recording media including a head, a demodulator, a memory, a memory controller and a decoder. The head intermittently reads digital signals in L- and R-channels compress-recorded on a recording medium. The demodulator demodulates the data of output from the head. The memory temporarily stores digital data from the demodulator. The memory controller writes the digital data output by the demodulator into the memory in a predetermined unit and reads out the digital data stored in the memory in a predetermined unit. Further, the memory controller controls the memory so that the digital data output by the demodulator are written into the memory at a transfer rate higher than the transfer rate at which the digital signals stored in the memory are read out. The digital data read out from the memory are supplied to the decoder which expands the digital data supplied. The digital data stored in the memory are supplied to the decoder in such a manner that the digital data in the L- and R-channels are alternately read out on a time-division basis. When digital data are supplied from the memory to the decoder, the decoder is supplied with a channel identification signal for identifying the channel associated with the digital data supplied by the memory.

According to the present invention, there is provided a reproducing apparatus for disc recording media including a reading unit, a memory, a controller and a decoder. The reading unit intermittently reads digital data in at least two channels recorded on a disc recording medium. The memory temporarily stores data output by the reading portion. The controller controls the reading operation performed by the reading unit on the memory unit based on the quantity of the digital data stored in the memory. Further, the controller controls data writing and reading operations on the memory so that the digital data output by the reading unit are written into the memory at a transfer rate higher than the transfer rate at which the digital signals stored in the memory are read out. The digital data in two channels stored in the memory are supplied to the decoder on a time-division basis. Each time digital data are supplied from the memory to the decoder, the controller supplies the decoder with a channel identification signal for identifying the channel associated with the data received by the decoder.

According to the present invention, when digital data read from the memory is supplied to the decoder on a time-division basis, an identification signal for identifying the channel associated with the data received by the decoder is simultaneously supplied to the decoder to allow the channel associated with the digital data supplied to the decoder to be properly identified. Even if an error in readout of digital data from the memory causes digital data in the same channel are subsequently supplied to the decoder, it can be identified by the decoder. Therefore, when the signals recorded on the recording medium are audio signals, it is possible to prevent phase shift of the L- and R-channels in the reproduction sound.

BRIEF DESCRIPTION OF THE DRAWINGS

FIG. 1A shows arrangement of data on a recording track. FIG. 1B shows a configuration of data in one cluster. FIG. 1C shows a configuration of an even sector. FIG. 1D shows a configuration of an odd sector.

FIG. 3 shows a configuration of data recorded in a P-TOC of a disc.

FIG. 4 shows a configuration of data recorded in a U-TOC of a disc.

FIG. 6 shows a configuration of a recording area of a disc.

FIG. 13A-1 through FIG. 13C-2 are timing charts for explaining channel identification signals. FIG. 13A-1 and FIG. 13A-2 show request signals. FIG. 13B-1 and FIG. 13B-2 show audio data. FIG. 13C-1 and FIG. 13C-2 show channel identification signals.

FIG. 17A-1 through FIG. 17C-2 are timing charts for explaining the channel identification signals shown in FIG. 16. FIG. 17A-1 and FIG. 17A-2 show request signals. FIG. 17B-1 and FIG. 17B-2 show audio data. FIG. 17C-1 and FIG. 17C-2 show the channel identification signals.

FIG. 18A is a waveform diagram showing audio data. FIG. 18B is a waveform diagram showing the L- and R-channel clocks.

DETAILED DESCRIPTION OF THE EMBODIMENTS

As an embodiment of a recording medium reproducing apparatus according the present invention, a recording and reproducing apparatus utilizing a magneto-optical disc as a recording medium will be described with reference to FIG. 2 through FIG. 18.

1. The Configuration of the Recording and Reproducing Apparatus

Figure 2:
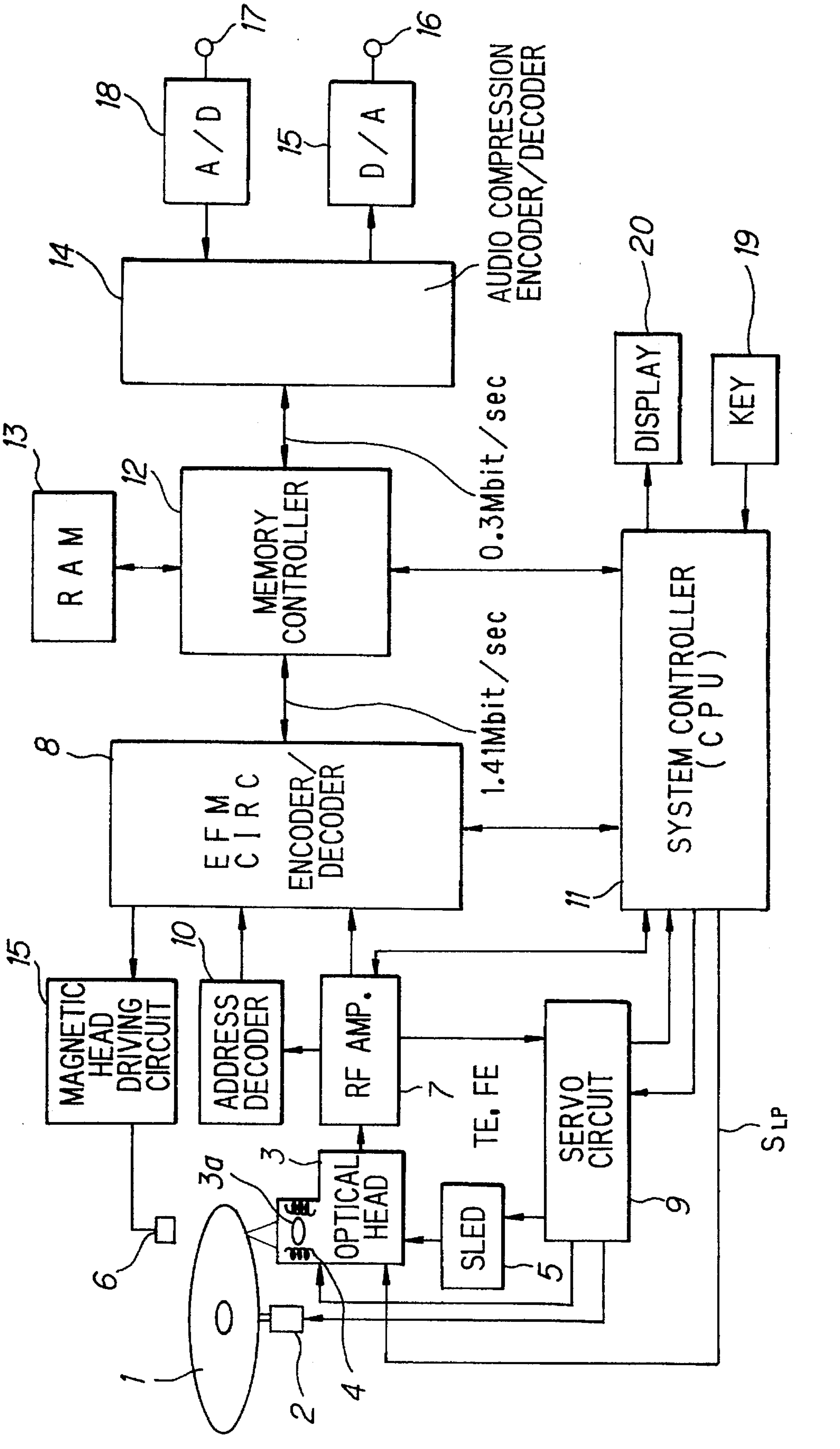
FIG. 2 is a block diagram showing major parts of a disc recording and reproducing apparatus according to the present invention.

FIG. 2 is a block diagram showing major parts of the recording and reproducing apparatus.

In FIG. 2, a reference numeral 1 designates a magneto-optical disc on which, for example, audio data are recorded and which is driven by a spindle motor 2 for rotation. A reference numeral 3 designates an optical head for radiating a light beam to the magneto-optical disc 1 during recording and reproduction which provides laser output at a high level for heating a recording track to the Curie-point during recording and provides laser output at a relatively low level for detecting data from the reflected light beam through the magnetic Kerr effect during reproduction.

For this purpose, the optical head 3 includes a laser diode as a light source, an optical system constituted by a polarizing beam splitter, an objective lens 3*a* and the like, and a detector for detecting the reflected light beam reflected by the magneto-optical disc 1. The objective lens 3*a* is supported by an actuator 4 so that it can be displaced in the radial direction of the disc and toward and away from the disc.

A reference numeral 6 designates a magnetic head for applying a vertical magnetic field modulated in accordance with the supplied data to the magneto-optical disc 1, which is disposed in a position wherein it is opposite to the optical head 3 with the magneto-optical disc 1 sandwiched therebetween. The optical head 3 as a whole and the magnetic head 6 are moved by a sled mechanism 5 in the radial direction of the disc.

The output signal from the detector of the optical head 3 is supplied to an RF amplifier 7. The RF amplifier 7 operates the supplied output signal to output a reproduction RF signal, a tracking error signal, a focus error signal, absolute position information recorded on the magneto-optical disc 1 as a wobbling groove, address information, a focus monitor signal and the like. The reproduction RF signal is supplied to an encoder/decoder unit 8. The tracking error signal and the focus error signal are supplied to a servo circuit 9 while the address information is supplied to an address decoder 10. The absolute position information and a focus monitor signal are supplied to a system controller 11 composed of, for example, a microcomputer.

The servo circuit 9 generates various kinds of servo drive signals in accordance with the supplied tracking error signal and focus error signal, a track jump command, a seek command, detection information on the rotational speed of the spindle motor 2 and the like from the system controller 11. The servo circuit 9 controls the actuator 4 and sled mechanism 5 to perform focus and tracking control and controls the spindle motor 2 at a constant angular velocity (CAV) or a constant linear velocity (CLV).

The reproduction RF signal is subjected to decoding processes such as EFM demodulation and CIRC at the encoder/decoder unit 8 and, thereafter, is temporarily written into a buffer memory 13 by a memory controller 12. Data reading from the magneto-optical disc 1 by the optical head 3 and transfer of reproduction data in the system from the optical head 3 up to the buffer memory 13 are performed at a rate of 1.41Mbit/sec and in an intermittent manner.

The data written in the buffer memory 13 are read at timing at which transfer will takes place at 0.3 Mbit/sec and are supplied to the encoder/decoder unit 14. The data read from the buffer memory 13 are subjected to reproduction signal processing at the encoder/decoder unit 14 including decoding of the audio-compressed data to be supplied to a D/A converter 15. The digital signals output by the encoder/decoder unit 14 are converted by the converter 15 into analog signals which are supplied through an output terminal 16 to a predetermined amplifying circuit unit to be reproduced. They are output as, for example, L and R audio signals.

Writing and reading of data at the buffer memory 13 are performed at addresses specified by the memory controller 12 by way of control over a write pointer and a read pointer. The write pointer (write address) is incremented at timing of 1.41Mbit/sec as described above while the read pointer (read address) is incremented at timing of 0.3Mbit/sec. As a result, the difference in the bit rates for writing and reading puts the buffer memory 13 in a state wherein it has some amount of data accumulated therein. When data are accumulated in the buffer memory 13 to its full capacity, the incrementation of the write pointer is stopped and, at the same time, the operation of reading data from the magneto-optical disc 1 by the optical head 3 is also stopped. However, the incrementation of the read pointer R is still kept going, there is no interruption in the reproduction sound output.

Assume that only the readout from the buffer memory 13 is kept going thereafter and the amount of the data accumulated in the buffer memory becomes equal to or less than a predetermined amount at a certain point in time. Then, the data readout by the optical head 3 and the incrementation of the write pointer W are resumed to accumulate data in the buffer memory 13 again.

Since the reproduction audio signals are output through the buffer memory 13 as described above, there will be no interruption in the reproduction sound output even if the tracking servo fails due to disturbance or the like. Further, data readout can be resumed by, for example, causing the optical head 3 to access a position preceding the position where the tracking servo have failed with data still remaining in the buffer memory 13 to thereby continue the operation without adversely affecting the reproduction output. In other words, the vibration resisting function can be significantly improved.

In FIG. 2, the address information and subcode data for control operations output by the address decoder 10 are supplied through the encoder/decoder unit 8 to the system controller 11 to be used for various control operations.

The system controller 11 is also supplied with lock detection signals from a PLL circuit for generating bit clocks for recording and reproducing operations and monitor signals indicating lack of frame synchronization signals for reproduction data of the L- and R-channels.

The system controller 11 outputs laser control signals $S_{LP}$ for controlling the operation of the laser diode of the optical head 3. The controller 11 uses the laser control signals $S_{LP}$ to control the turning on/off of the output of the laser diode and, when the output is on, to make switching between the light beam for reproduction having a relatively low output level and the light beam for recording having a relatively high output level depending on the operation mode, i.e., recording or reproduction.

When information signals are recorded on the magneto-optical disc 1, recording signals such as analog audio signals supplied to an input terminal 17 are converted by an A/D converter 18 into digital signals which in turn are supplied to the encoder/decoder unit 14 to be subjected to an audio compression encoding process. The digital data compressed by the encoder/decoder unit 14 are temporarily written in the buffer memory 13 by the memory controller 12 and are read out at predetermined timing to be sent to the encoder/decoder unit 8. The digital data read out from the memory 13 are subjected to encoding processes such as CIRC encoding and EFM modulation at the encoder/decoder unit 8 and are supplied to a magnetic head driving circuit 15 thereafter.

The magnetic head driving circuit 15 supplies magnetic head driving signals to the magnetic head 6 in accordance with the recording data encoded by the encoder/decoder unit 8. Specifically, the magnetic head 6 provides a vertical magnetic field which has been modulated in accordance with the recording data. At this time, the system controller 11 supplies the optical head 3 with a control signal such that the light beam at a recording level will be output.

A reference numeral 19 designates an operation input unit on which keys to be operated by a user are provided, and a reference numeral 20 designates a display unit constituted by, for example, a liquid crystal display. The operation input unit 19 has a recording key, a reproduction key, a stop key, an AMS key, search key and the like which are operated by a user. The operation input unit 19 and display unit 20 are connected to the system controller 11.

When recording and reproducing operations are performed on the disc 1, management information, i.e., a P-TOC (precorded TOC) and a U-TOC (user TOC) stored in the disc 1 are read out. According to such management information, the system controller 11 determines the address of a segment on the disc 1 in which recording or reproduction is to be performed. For this purpose, the buffer memory 13 is divided into a buffer area for the recording data and reproduction data as described above and an area wherein such management information is stored.

When the disc 1 is loaded, the system controller 11 reads such management information by executing reproduction of the innermost part of the disc wherein the management information is recorded and stores it in the buffer memory 13. Thereafter, the system controller 11 refers to it during recording and reproduction operations on the disc 1.

The U-TOC is edited and rewritten as data are recorded or erased. Each time a recording or erasing operation is performed, the system controller 11 performs editing processes such as rewriting of the start and end addresses of the data which have been recorded or erased on the U-TOC information stored in the buffer memory 13. The rewriting operation is extended to the data in a U-TOC area of the disc 1 by controlling the optical head 3 and magnetic head 6 at predetermined timing depending on the above-described rewriting operation.

2. P-TOC

A description will now be made on the P-TOC as management information for managing audio data sectors recorded on the disc 1 in the form of sector data and the recording and reproduction of the audio data.

The P-TOC information allows specification of areas such as data-recordable areas on the disc (hereinafter referred to as recordable user area) and management of the U-TOC area. If the disc 1 is a pre-recorded disc which is an optical disc such as the CD to be exclusively used for reproduction, the P-TOC also allows management of pieces of music recorded thereon.

A format of the P-TOC is shown in FIG. 3.

FIG. 3 shows one sector (sector 0) of the P-TOC information which is repeatedly recorded in an unrewritable area at the inner circumferential side of the disc allotted for the P-TOC. Sector 0 through sector 4 are prepared for the P-TOC format but the sector 1 and later are optional.

A data area of a P-TOC sector (4 bytes×588=2352 bytes) is added with four bytes representing a synchronization pattern, addresses indicating the cluster and sector addresses and the like each consisting of one-byte data of all ones. This leading portion serves as a header for indicating the P-TOC area.

The header is followed by an identification ID expressed in ASCII codes corresponding to characters "MINI" provided in predetermined address positions.

Recorded subsequently are the disc type, the recording level, the title number of the first piece of music recorded (First TNO), the title number of the last piece of music (Last TNO), a readout start address $RO_A$, a power cal area start address $PC_A$, a start address $UST_A$ for a U-TOC (a data area in a UTOC sector 0 in FIG. 4 to be described later), a start address $RST_A$ for a recordable area (recordable user area) and the like.

Then, a corresponding table specifying data portion is provided, which has table pointers (P-TNO1–P-TN0255) establishing correspondence between the recorded pieces of music etc. and parts tables in a management table portion to be described later.

In the area following the corresponding table specifying data portion, a management table portion is prepared, in which there are provided 255 parts tables from 01h through FFh corresponding to the table pointers (P-TN001–P-TN0255) in the data portion for specifying corresponding tables. In this specification, a numerical value having the suffix "h" is in the so-called hexadecimal representation. In each parts table, a start address and an end address which are the staring and end points, respectively, of a certain segment and mode information on the segment (track mode) can be recorded.

As the mode information on the segment in each parts table, there is recorded information such as whether, for example, overwrite inhibition and data copying inhibition are set for the segment or not, whether the segment has audio information or not, and whether it is monophonic or stereophonic.

The contents of the parts tables 01h through FFh in the management table portion are indicated by the table pointers P-TN001–PTNO225 of the corresponding table specifying data portion. Specifically, for the first piece of music, a certain parts table, e.g., 01h is recorded as the table pointer 1. In practice, however, in a table pointer, a numerical value which can be used to indicate a certain parts table by a byte position in the P-TOC sector 0 through a predetermined calculation is specified. In this case, the start address for the parts table 01h is the start address for the position wherein the first piece of music is recorded. Similarly, the end address thereof is the end address of the position wherein the first piece of music is recorded. The track mode information is information on the first piece of music.

Similarly, for the second piece of music, the start and end addresses for the position wherein the second piece of music is recorded and the track mode information are recorded in a parts table, e.g., 02h pointed by the table pointer P-TN02.

Since table pointers up to P-TN0255 are prepared, management can be similarly carried out up to 255th piece of music on the P-TOC.

Such a configuration of the P-TOC sector 0 makes it possible, for example, to access and reproduce a predetermined piece of music during reproduction.

In the case of a recordable and reproducible magneto-optical disc, there is no music recording area recorded by the use of pits as in the so-called CDs. Therefore, the above-described corresponding table specifying data portion and the management table portions are not used and all the bytes are set as "00h". These are managed by the U-TOC to be described later. For a disc of a hybrid type having both an unrewritable area wherein music or the like is prerecorded and a recordable magneto-optical area, however, the corresponding table specifying data portion and the management table portions are used for managing the pieces of music in the unrewritable area.

3. U-TOC

The U-TOC will now be described.

FIG. 4 shows the format of one sector in the U-TOC which is a data area for storing management information mainly concerning music recorded by a user and unrecorded areas (hereinafter referred to as free area) wherein music can be newly recorded. The U-TOC also has formats for sector 0 through sector 4 but the sector 1 and later are optional.

For example, when some music data are to be recorded on the disc 1, the system controller 11 finds a free area on the disc from the U-TOC and controls the optical head, magnetic head and the like so that the music data are recorded in the free area thus found. The system controller 11 also determines an area having data to be reproduced recorded therein from the U-TOC and causes the optical head 3 to access-such an area to read the read.

The sector in the U-TOC shown in FIG. 4 (sector 0) is first provided with a header as for the P-TOC which is followed by data such as a manufacturer code, a model code, the title number of the first piece of music (First TN0), the title number for the last piece of music (Last TNO), the status of the utilization of the sector, the disc serial number, the disc identification, etc., recorded in predetermined address positions. In addition, an area for recording various table pointers (P-DFA, P-EMPTY, P-FRA, and P-TNO1–P-TN0255) are prepared in the U-TOC as a corresponding table pointing data portion for identifying the areas for pieces of music recorded by a user and unrecorded areas by putting them in correspondence with a management table to be described later.

255 parts tables 01h through FFh are provided as a management table portion to which the table pointers P-DFA through P-TN0255 in the corresponding table pointing data portion are to correspond. In each parts table, start and end addresses at which a certain segment starts and ends and the mode information (track mode) for the segment are recorded as for the P-TOC shown in FIG. 3. In this U-TOC sector 0, the segment indicated by each parts table may be linked to another segment. Therefore, link information indicating the parts table on which the start and end addresses for the another segment to be linked can be recorded.

In this type of recording and reproducing apparatus, even if the data for one piece of music are physically discretely recorded, i.e., the data are recorded in a plurality of segments (the term "segment" as used here means a track portion wherein physically continuous data are recorded), the data can be reproduced without problem by accessing them across the segments. Therefore, when a user records a piece of music or the like, it may be distributed among a plurality of segments in order to efficiently use recordable areas. For this purpose, the link information is provided to make it possible to link parts tables by specifying the parts tables to be linked using, for example, the numbers 01h–FFh assigned to the parts tables (in practice, they are indicated by numerical values obtained by predetermined operational processes as byte positions in the sector 0 of the U-TOC). For a prerecorded piece of music or the like, since it is not normally distributed among segments, the link information is all set as "00h" in the P-TOC sector 0 as shown in FIG. 3.

In other words, in the management table portion of the U-TOC sector 0, one parts table represents one segment. For example, for a piece of music composed by linking three segments, the positions of the segments are managed using three parts tables linked by the link information.

The contents of the segments in the parts tables 01h through FFh in the management table of the U-TOC sector 0 are indicated by the table pointers (P-DFA, P-EMPTY, P-FRA, and P-TN001–P-TN0255) in the corresponding table pointing data portion as follows.

The table pointer P-DFA indicates a defective area on the magneto-optical disc 1 and specifies one parts table or the leading parts table of a plurality of parts tables showing a track portion (segment) which is regarded as a defective area because of a scratch or the like. Specifically, when a defective segment exists, any one of 01h through FFh is recorded in the table pointer P-DFA and the defective segment is indicated on the corresponding parts table by the start and end addresses thereof. If there is another defective segment, another parts table is specified as the link information of the parts table, and the parts table also shows a defective segments. If there is no further defective segment, the link information is set as, for example, "00h".

The table pointer P-EMPTY indicates an unused parts table or the leading parts table of a plurality of unused parts tables in the management table portion. If there is an unused parts table, any one of 01f through FFh is recorded as the table pointer P-EMPTY. If there are a plurality of unused parts tables, such parts tables are sequentially specified by link information starting with the parts table specified by the table pointer P-EMPTY to link all the unused parts tables on the management table.

The table pointer P-FRA indicates data-writable free area including erased areas on the magneto-optical disc 1 and specifies one parts table of the leading parts table of a plurality of parts tables showing a track portion (segment) which is a free area. Specifically, if there is a free area, any one of 01h through FFh is recorded in the table pointer P-FRA, and the segment which is a free area is indicated by the start and end addresses thereof in the corresponding parts table. If there are plurality of such segment, i.e., if there are a plurality of parts tables, they are sequentially specified by link information up to the parts table whose link information is "00h".

Figure 5:
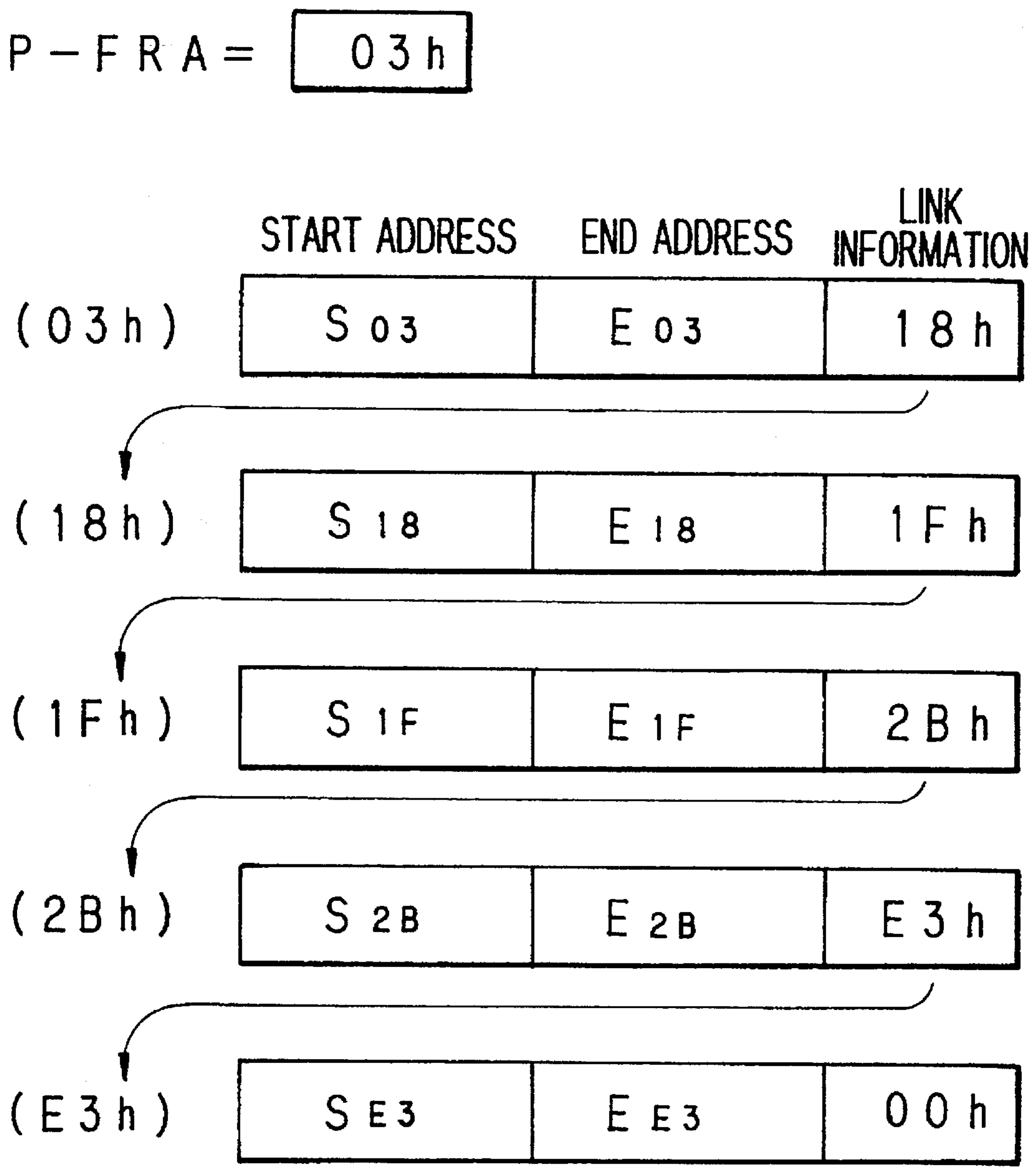
FIG. 5 illustrates the state of management of a U-TOC of a disc.

FIG. 5 is a diagram typically showing the state of management of segments which are free areas using parts tables. This figure shows that when segments 03h, 18h, 1Fh, 2Bh, and E3h are free areas, such state is represented by linkage between parts tables 03h, 18h, 1Fh, 2Bh, and E3h following the corresponding table pointing data P-FRA. Detective areas and unused parts tables as described above are managed in the same manner.

In the case of a magneto-optical disc on which no audio data such as music are recorded and which has no defect, the parts table 01h is specified by the table pointer P-FRA to thereby indicate that the entire recordable user area of the disc is unrecorded. In this case, since the remaining parts tables 02h through FFh are not used, the parts table 02h is specified by the above-described table pointer P-EMPTY; the parts table 03h is specified as the link information of the parts table 02h; the parts table 04h is specified as the link information of the parts table 03h; and such linkage is continued up to the parts table FFh. In this case, the link information of the parts table FFh will be "00h" that means that there is no further linkage.

For the parts table 01h, the start address of the recordable user area is recorded as its start address, and the address preceding the readout start address is recorded as its end address.

The table pointers P-TNO1 through P-TN0255 indicate music data recorded by a user on the magneto-optical disc 1. For example, the table pointer P-TNO1 specifies the parts table showing the segment which comes first in terms of time among one or a plurality of segments in which the data of the first piece of music are recorded.

For example, if the track for the data of the first piece of music is not split on the disc, i.e., the data are recorded in one segment, the first piece of music is recorded in the area indicated by the start and end addresses of the parts table indicated by the table pointer P-TNO1.

For example, if the second piece of music is discretely recorded in a plurality of segments on the disc, those segments are specified in a temporal order to indicate the position in which the piece of music is recorded. Specifically, parts tables are sequentially specified by link information according to the temporal order starting with the parts table specified by the table pointer P-TN02 and are linked up to the parts table having link information "00h" (in the same manner as that shown in FIG. 5). Thus, all the segments wherein the data constituting, for example, the second piece of music are recorded are sequentially specified and recorded. This makes it possible to fetch continuous music information from segments discretely located on the disc and to perform recording with efficient utilization of the recording area by causing the optical head 3 and the magnetic head 6 to access by means of the data in the U-TOC sector 1 in reproducing the second piece of music and overwriting in the area for the second piece of music.

As described above, the areas in the disc are managed using the P-TOC, and audio data recorded in the recordable user area and free areas are managed using the U-TOC.

Such TOC information is read into the buffer memory 13 for reference by the system controller 11 during its control operations.

4. Data Recording Area

Next, the format of a recording area for recording audio data is set as shown in FIG. 6.

In this sector (one sector has 2352 bytes), the leading 12 bytes are synchronization data; the next 3 bytes are set as cluster and sector addresses; the next 1 byte is the mode; and these 16 bytes constitute a header.

Following the header, 4 bytes are assigned as a subheader, and the bytes following the subheader, i.e., 2332 bytes from the 21st byte through the 2352nd byte are allotted to the data area (Data0– Data2331).

Figures 1A, 1B, 1C, 1D:
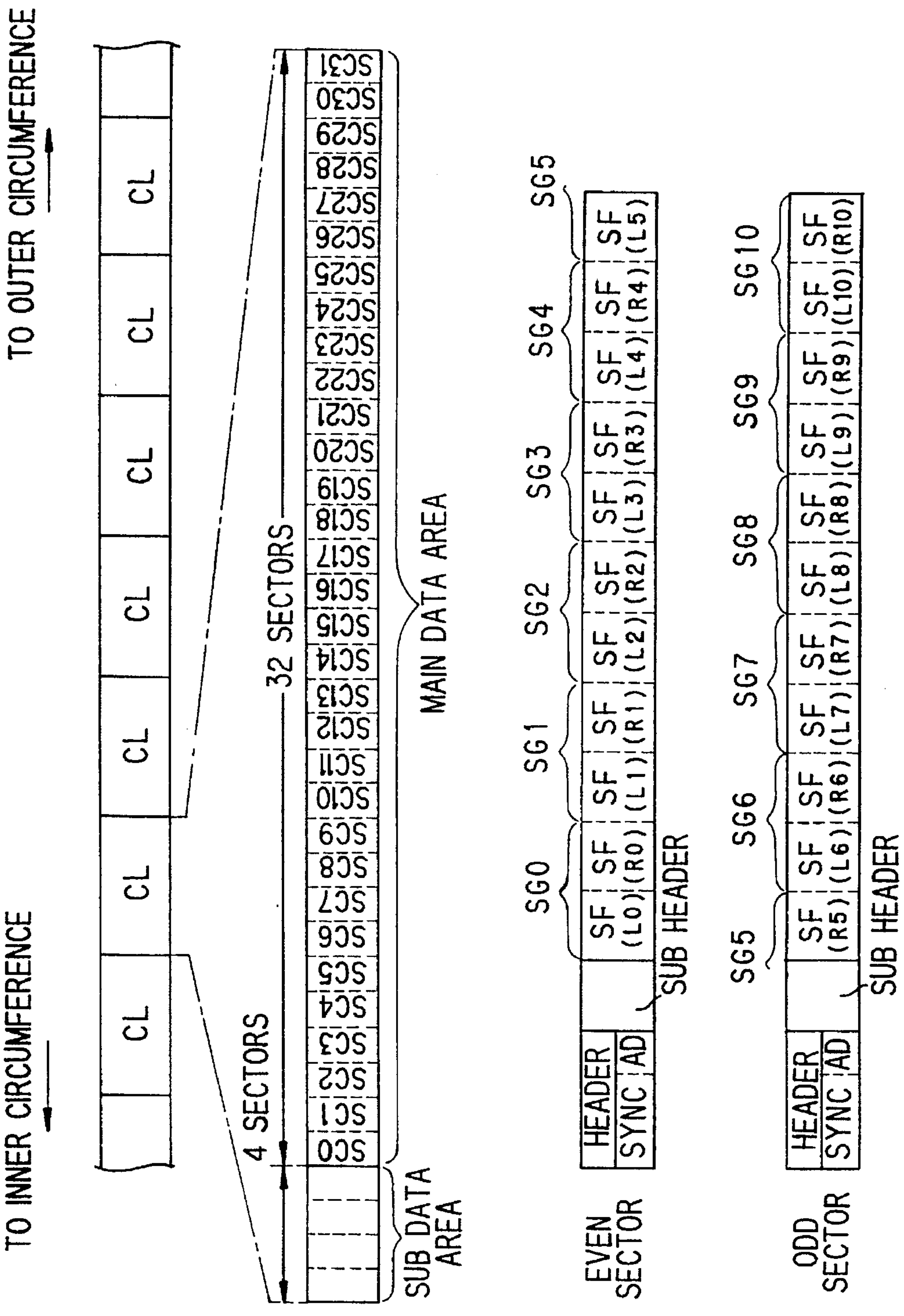
FIG. 1A through FIG. 1D illustrate a format of a magneto-optical disc.

In this data area of 2332 bytes, 11 sound frames each consisting of 212 bytes are recorded (see FIG. 1C and FIG. 1D). Therefore, 5.5 sound groups are recorded in one sector. 11 sound groups are recorded in two sectors, i.e., an even sector whose sector address is an even number (the LSB of the address is 0) and the next sector, i.e., an odd sector whose sector address is an odd number (the LSB of the address is 1).

5. The Configuration of Areas in the Buffer Memory

Figure 7:
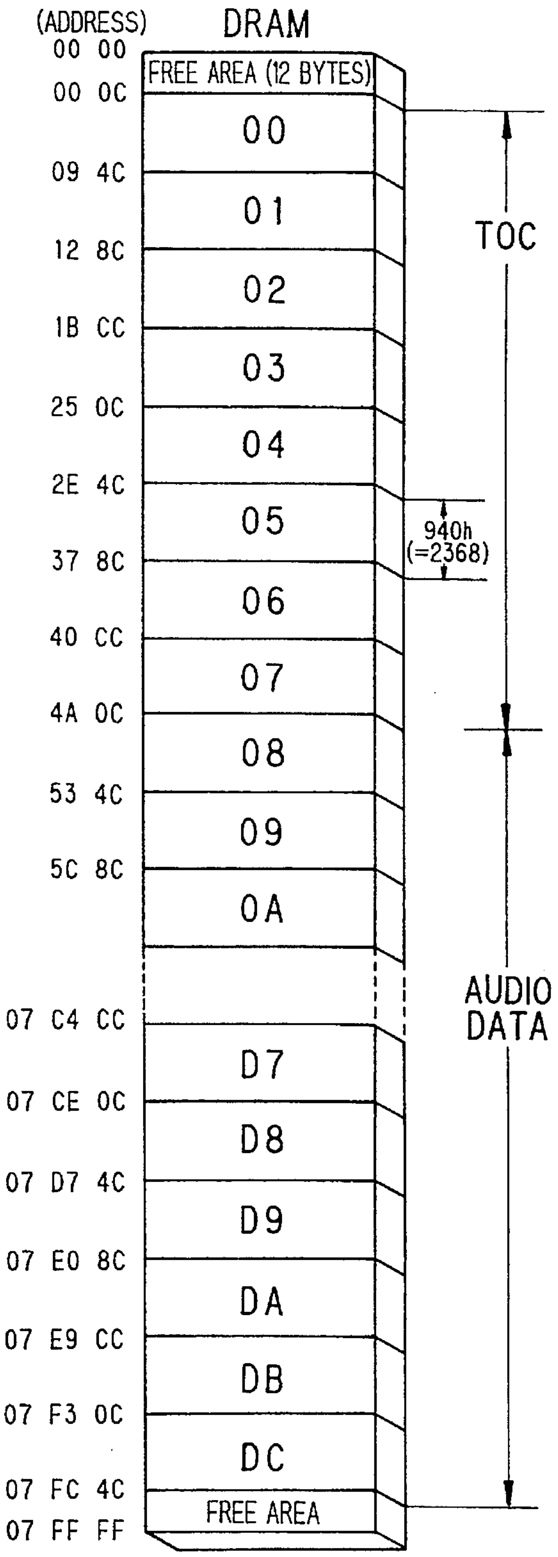
FIG. 7 illustrates a configuration of a recording area of a RAM in a recording and reproducing apparatus.

In order to store the data recorded in the P-TOC and U-TOC areas and the data read out from the data recording area, a memory area as shown in FIG. 7 is allotted in the buffer memory 13 in the present invention.

The buffer memory 13 has a memory capacity of 4Mbits and is set so that it keeps the data recorded in those TOC areas in an amount corresponding to 8 sectors. A DRAM is used as the buffer memory 13.

The first 12 bytes (addresses 0000h through 000Ch) are a free area and the next 18944 bytes in addresses 000Ch through 4AOBh are used for the data recorded in the TOC areas. In other words, each of eight areas, i.e., areas 00 through 07 holds the data recorded in the P-TOC and U-TOC.

Each of those areas has 2368 bytes and is therefore capable of storing additional data of 16 bytes in addition to data in an amount corresponding to one sector which consists of 2352 bytes (see FIG. 3 and FIG. 4).

Further addresses 4AOCh through 07FC4Bh are used for the data read out from the data recording area, i.e., areas 08 through DC each having 2368 bytes are used for accumulation in and readout from the audio data sectors. Each of those areas has 2368 bytes and is therefore capable of storing additional data of 16 bytes in addition to data in an amount corresponding to one sector which consists of 2352 bytes (see FIG. 6).

Addresses 07FC4Ch through 07FFFFh are a free area. 000Ch through 07F30Ch shown as the leading addresses of the areas 00 through DC are calculated based on the count value of the sectors to be written or read. Specifically, if the sector count value is represented by NS, a sector address is given by (940h=NS+0Ch). "+0Ch" is an offset for the leading free area. Therefore, the leading address of the area 08, for example, is calculated as 940h X 08h+0Ch=4AOCh.

Figure 8:
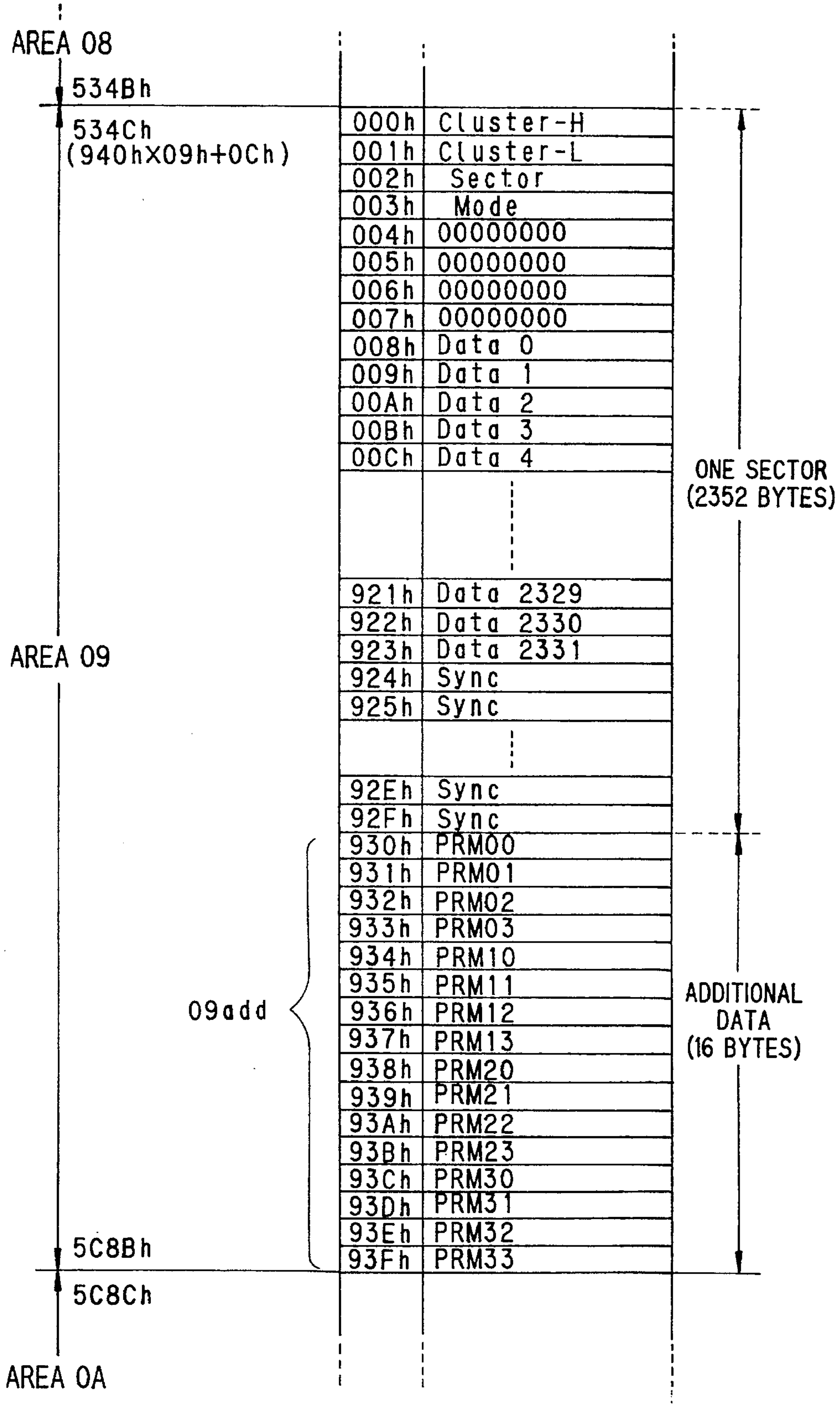
FIG. 8 illustrates a configuration of a recording area of a RAM in a recording and reproducing apparatus.

The configuration of each area consisting of 2368 bytes is showing in FIG. 8 using the area 09 as an example. The area 09 stores audio data, i.e., the data sector shown in FIG. 6. The leading address of this area 09 is 534Ch, and 2368 bytes (000h through 93Fh) from this leading address up to the address 5C8Bh are used as illustrated.

Since writing into a sector is performed in response to detection of synchronization, the cluster address, sector address and mode are first stored; the subheader of four bytes are stored next; and, thereafter, the Data0 through Data2331 are sequentially stored. Then, SYNCs are written to complete the storage of one sector (2352 bytes).

At this time, 16 bytes are left after the sector is stored in this area. These 16 bytes (930h through 93Fh) are assigned to a memory area for sector parameters (additional area 09add) to allow additional data to be stored. The term "additional data" means various kinds of information stored in area of these 16 bytes depending on the sector.

The address of each byte can be obtained by adding the byte address to the leading address of the area (sector address). For example, the address of the Data0 in the area 09 is (940h×09h+ 0Ch)+008h=534Ch+008h=5354h.

As described above, in the areas 00 through DC in the buffer memory 13, additional areas (00add through DCadd) in which additional data can be stored depending on sector data are respectively set. This makes it possible to maintain the track number, elapsed time, track number, link information, error information and the like associated with a sector depending on the sector.

When sector data are read out, the additional data associated thereto are read out to be used for management of various operations.

With additional data maintained in the buffer memory 13 in correspondence to sector data, when data are read out from the buffer memory 13, the system controller 11 can obtain various kinds of information on the read sector, which is convenient from the viewpoint of the system operation. For example, the intervention of the buffer memory 13 in reproduction results in a difference between the point in time at which information such as the elapsed time of a performance in a sector and the point in time at which the actual reproduction is output. However the information of the elapsed time of the performance in the sector can be read out at the point in time at which the data in the sector is read out from the buffer memory.

In addition, when the data of a sector is written, the track number (music number), track change information, track mode information such as whether the mode is monophonic or stereophonic, emphasis and copyright, forward and backward link information included in the management information for audio data and error information can be written in the buffer memory at the same time and can be read out when the data of the sector is read out from the buffer memory to be used for controlling various operations.

As described later, it is possible to generate the channel identification signals SLR which are output when data are transferred from the memory controller 12 to the encoder/decoder unit 14 using this additional data in the present embodiment.

6. The Configuration of the Memory Controller

A description will now be made on the configuration and operation of the memory controller 13 for using the buffer memory 13 in such a manner.

Figure 9:
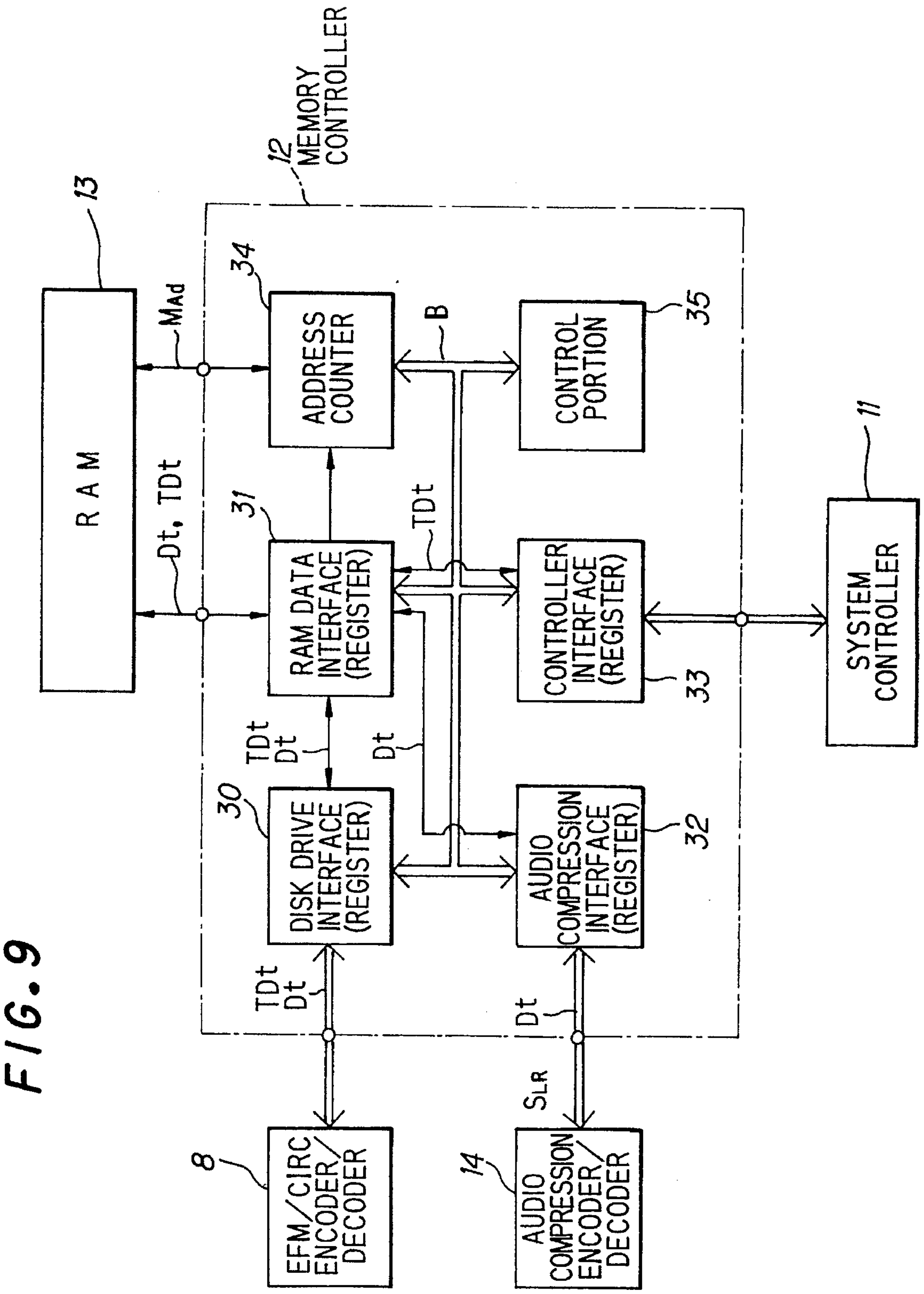
FIG. 9 is a block diagram showing a specific configuration of a memory controller of a recording and reproducing apparatus.

FIG. 9 is a block diagram showing the internal configuration of the memory controller 12.

A reference numeral 30 designates a disc drive interface unit which keeps recording/reproduction data Dt, TOC information TDt and the like and sends and receives them to and from the disc drive side, i.e., the encoder/decoder unit 8.

A reference numeral 31 designates a RAM data interface unit for writing and reading data into and from the buffer memory 13 and for holding such data. The data to be written and read are the recording/reproduction data Dt and TOC information TDt.

A reference numeral 32 designates an audio compression interface unit which keeps the recording/reproduction data Dt and the like and sends and receives them to and from the audio compression unit, i.e., the encoder/decoder unit 14.

A reference numeral 33 designates a controller interface unit which serves as an interface to the system controller 11. It exchanges the TOC information TDt with the system controller 11, receives the input of control signals from the system controller 11 and keeps such data.

A reference numeral 34 designates an address counter. The address counter 34 generates write and read addresses ($M_{AD}$) according to the operation to be described later based on address specification data, supplied through the controller interface unit 33, mode information, the synchronization data of a sector detected by the disc drive interface unit 30 or audio compression interface unit 32, byte count signals supplied by the RAMdata interface unit 31 and the like, the addresses being output to the buffer memory 13.

A reference numeral 35 designates a control unit for controlling the operation of each portion of the memory controller 12, according to commands from the system controller 11, the control unit 35 controls write and read operations on the buffer memory 13 and the sending and receiving of data and the like to and from the encoder/decoder unit 8 and encoder/decoder unit 14. It also controls the outputting of channel identification signals SLR to the encoder/decoder unit 14, which will be described later.

B designates a control bus connecting those parts.

Figure 10:
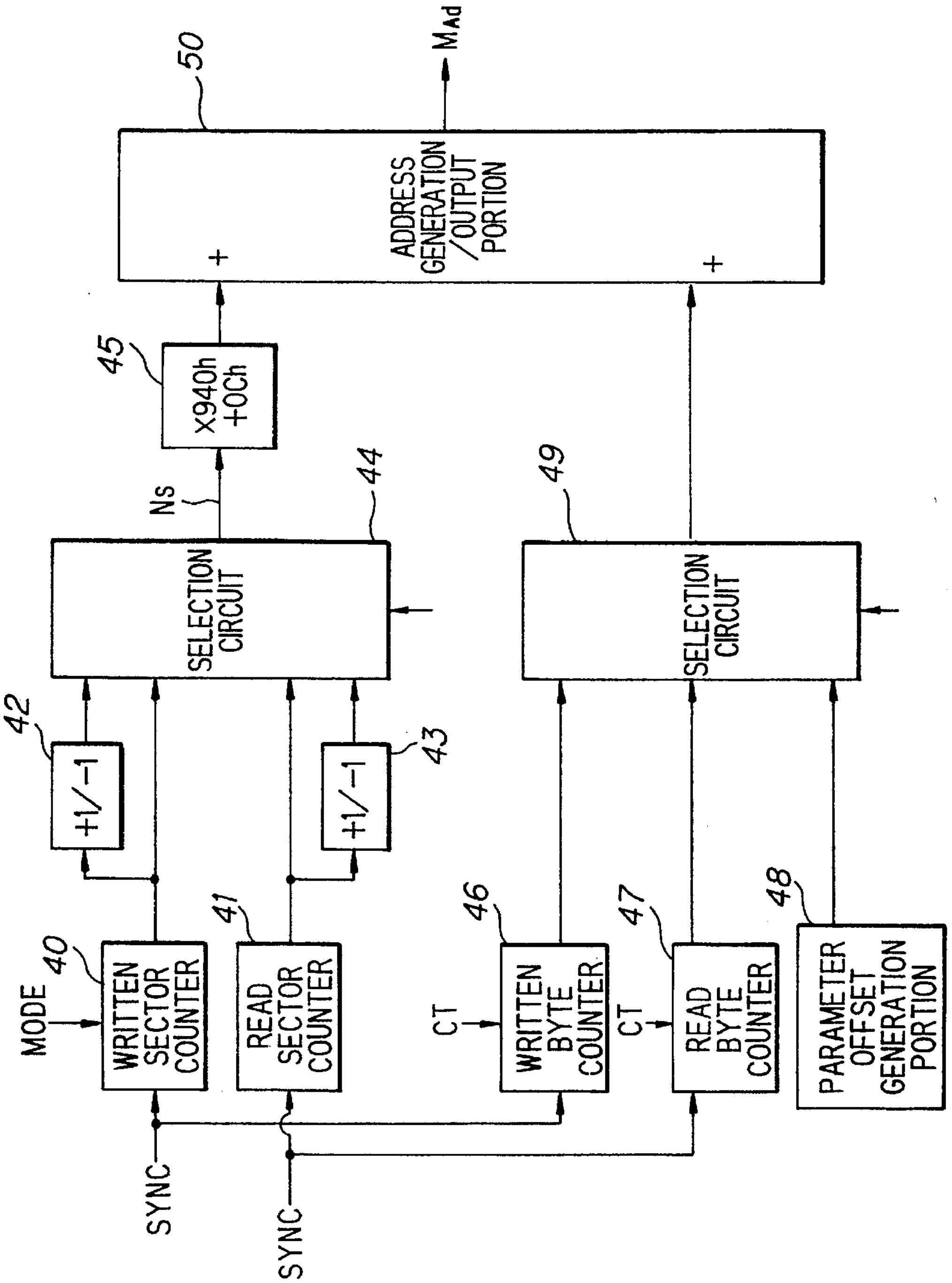
FIG. 10 is a block diagram showing a specific configuration of an address counter of a memory controller.

The configuration of the address counter 34 is shown in FIG. 10.

A reference numeral 40 designates a write sector counter which performs a counting operation based on sector synchronization to obtain an address for writing data into the buffer memory 13. A reference numeral 41 designates a readout sector counter which performs a counting operation based on sector synchronization to obtain an address for reading data from the buffer memory 13. When sector data read out from the disc are written into the buffer memory, the writing operation is performed in any one of a cyclic mode, an advance mode and a retry mode, and the counting operation of the write sector counter 40 is controlled depending on the mode.

A reference numeral 42 designates an adder/subtracter circuit which can add or subtract one to or from the count value in the write sector counter 40. A reference numeral 43 designates an adder/subtracter circuit which can add or subtract one to or from the count value in the read sector counter 41.

A reference numeral 44 designates a selection circuit which selects and outputs any one of the count values in the write sector counter 40, read sector counter 41 and adder/subtracter circuits 42 and 43. The selection operation of the selection circuit 44 is performed in accordance with, for example, a control signal supplied by the system controller 11 through the controller interface unit 33.

A reference numeral 45 designates a sector address operating unit which performs the operation ($N_S \times$940h+0Ch) on sector count values NS output by the selection circuit 44. In other words, it calculates the leading addresses of the areas 00 through DC described with reference to FIG. 7, i.e., the leading address of each sector in the buffer memory 13.

A reference numeral 46 designates a write byte counter which is reset based on sector synchronization and which performs a counting operation in accordance with byte count signals CT from the RAMdata interface unit 31 to obtain byte addresses for writing data into the buffer memory 13, i.e., to identify the order of the byte in the sector. A reference numeral 47 designates a readout sector counter which is reset based on sector synchronization and which performs a counting operation in accordance with byte count signals CT from the RAM data interface unit 31 to obtain byte addresses for reading data from the buffer memory 13, i.e., to identify the order of the byte in the sector.

A reference numeral 48 designates a parameter offset generation unit for generating predetermined parameter offsets for accessing the additional areas (00add through DCadd) each containing 16 bytes provided in the respective areas 00 through DC in the buffer memory 13 as described above. This parameter offset generation unit 48 generates "930h" through "93Fh" as the parameter offsets for accessing the additional area shown in FIG. 8.

A reference numeral 49 designates a selection circuit which selects and outputs the output of the write byte counter 46, read byte counter 47 or parameter offset generation unit 48 as byte address data.

A reference numeral 50 designates an address generation/output unit which adds a byte address output by the selection circuit 49 to a sector address output by the sector address operating unit 45 to obtain an access address which is output to the memory buffer 13.

7. Writing and Reading Operations on Buffer Memory

With the above-described configuration of the address counter 34 in the memory controller 12, when sector data read out from the disc 1 are stored in the buffer memory 13 during reproduction of the disc 1, it is possible to obtain the access addresses of the additional areas using the values in the sector counters 40 and 41 for generating sector addresses and the output of the parameter offset generation unit 48. When sector data are read out from the buffer memory 13 and are output to the encoder/decoder unit 14, the access addresses of the additional areas can be similarly obtained. This makes it possible to perform additional data reading and writing operations on the buffer memory 13. Various examples of the method of accessing the additional areas will now be described.

The reading and writing operations on the additional areas can be performed when input data are stored in the buffer memory and when data are read out from the buffer memory 13 and supplied as recording data during a recording operation of this recording and reproducing apparatus. In this case, the access addresses of the additional areas can be obtained in substantially the same process as that in the address counter 34 which will be described later. So the description of the process is omitted here.

Prior to a description on an example of an operation of recording additional data when data read out from the disc are written into the buffer memory 13, the operation in the mode of writing data read out from the disc into the buffer memory 13 during the reproduction operation of the recording and reproducing apparatus will be described with reference to FIG. 11.

As described above, when sector data read out from the disc is written into the buffer memory 11, any one of the cyclic mode, advance mode or retry mode is provided as the writing operation. They are provided to control the mode in which the sector of interest is written in a predetermined area (any one of the areas 08 through DC) and the cyclic mode is first set when writing is started. In the cyclic mode, when sector synchronization is input, the sector counter 40 maintains its count value at that time.

Therefore, in the case that addressing is started with the area 08, the sector address calculated by the sector address operating unit 45 is always the address 4AOCh, and a write access is carried out in the area 08 based on the count value in the write byte counter 46.

Then, a sector synchronization interrupt occurs; the data in the sector are written in each byte; and it is determined whether the written sector is the sector of interest or not. If not, the data of another input sector are written in each byte in the area 08 in response to a sector synchronization interrupt in accordance with the cyclic mode. In other words, data are overwritten on the area in the cyclic mode until the sector of interest is written.

For example, when the sector of interest is written in the area 08, the advance mode is entered at that point in time. In the advance mode, the write sector counter 40 counts in response to sector synchronization.

As a result, the access address becomes an address indicating the area 09 on the sector synchronization for the next sector, and sector data are written in each byte in the area 09 after the sector synchronization.

Thereafter, if there is no writing error, sector data are sequentially written in each area in the advance mode until the writing is completed, i,e., until one cycle of writing operation in an intermittent manner is completed.

Each time the advance mode is entered or the advance mode continues into a new area, it is determined whether there has been a write error in the sector written immediately before the new area or not and, if yes, the retry mode is entered to perform writing again.

For example, if a write error in the area 09 is detected when the area 0A is entered, the retry mode is entered and the count value in the write sector counter is decremented by 1, i.e., the access address is changed to an address in the area 09. Then, writing is continued in the area 09 in the cyclic mode in response to sector synchronization, and the advance mode is re-entered when the sector of interest has been written.

When data of a sector are written in such a manner, the addresses for the additional data corresponding to the sector are generated as follows in writing such the additional data in the additional area.

Figure 11:
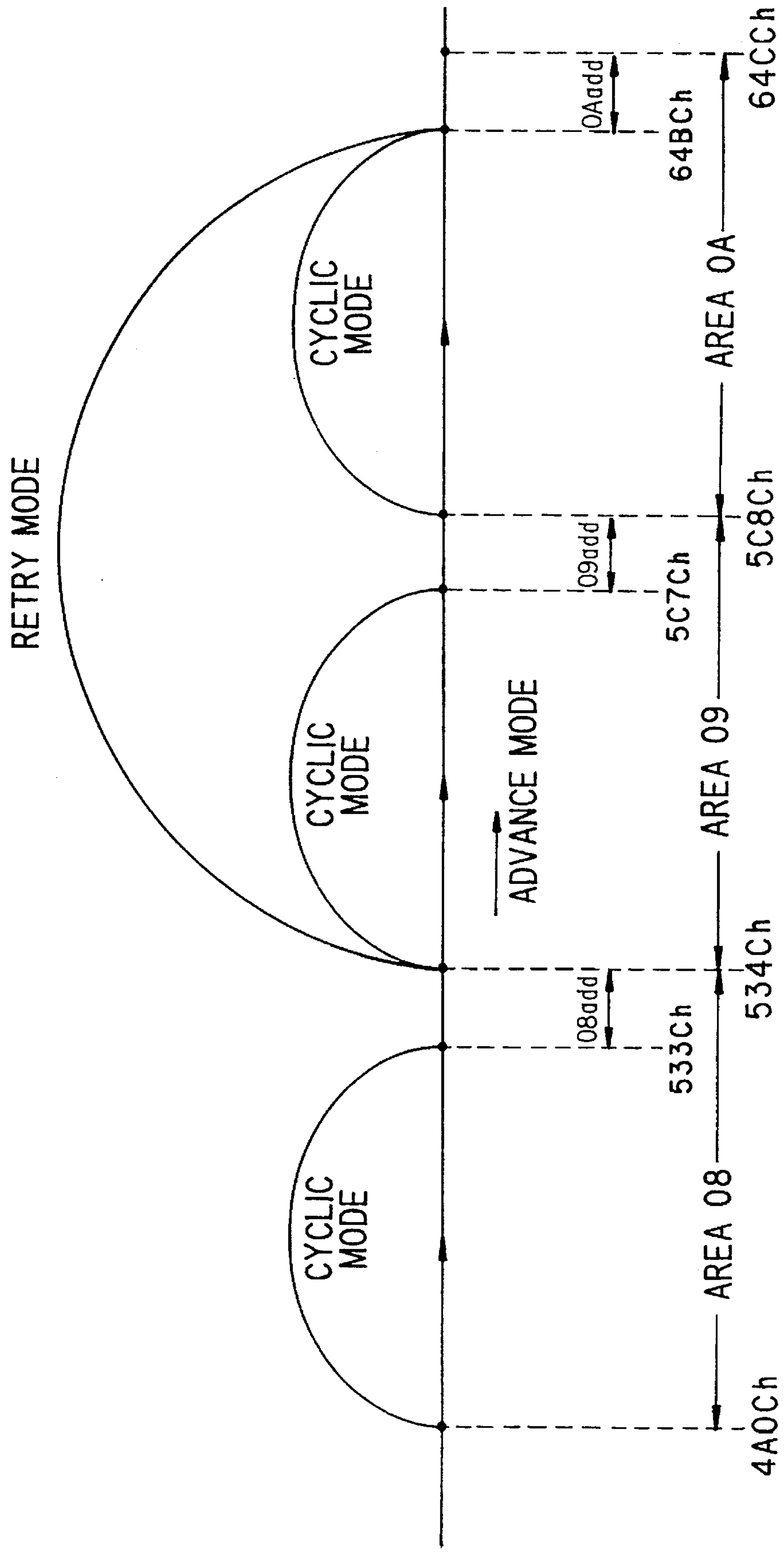
FIG. 11 illustrates an operation of writing data into a buffer memory.

For example, if the advance mode is entered in the example shown in FIG. 11 to write the area 09, correct sector data have already been written in the area 08. It is therefore preferable to be able to write additional data for the written sector in the additional area 08add in the area 08. In other words, what is needed is the access address of the additional area 08add.

For this purpose, the count value of the write sector counter 40 which is now a value indicating the area 9 is decremented by the adder/subtracter circuit 42 by 1 and the selection circuit 44 is caused to select and output the output of the adder/subtracter circuit 42 to obtain the sector address for the area 08.

At the same time, the parameter offset corresponding to the byte in the additional area in which writing is to be performed, is output from the parameter offset generation unit 48 through the selection circuit 49.

For example, if additional data are to be written as a parameter PRM 20 in the byte 938h in the sector shown in FIG. 8, a parameter offset "938h" is generated.

As a result, in the address generation/output unit 50, the parameter offset 938h is added to a sector address 4AOCh in the area 08 to generate and output an address indicating the position of the parameter PRM 20.

If it is desirable to write additional data in corresponding to a sector to be written in an area in the cyclic mode, a predetermined parameter offset is output as it is from the parameter offset generation unit 49 to be selected and output by the selection circuit 49. As a result, the access address for a predetermined byte in the additional area 09add in the area 09 is generated.

Next, when sector data are read out from the buffer memory 13 to be transferred as reproduction data, reading normally sequentially proceeds in areas 08, 09, 0A and so on. For example, when the sector data in the area 09 are being read and transferred, it is preferable that the additional data for the next sector, i.e., the sector stored in the area 0A are read out.

In this case, a value obtained by decrementing the countvalue in the read sector counter 41 by 1 by the adder/ subtracter circuit 43 is selected and output by the selector circuit 44. At the same time, a predetermined parameter offset is output by the parameter offset generation unit 48 and is selected and output by the selector circuit 49.

As a result, an address 64BCh indicating the area 0A is obtained by the sector address operating unit 45 as a sector address and is added with the parameter offset value to obtain the address of a particular byte in an additional area 0Aadd in the area 0A. It is therefore possible to read out the desired additional data using this address.

Address calculation processes in various situations during the reproduction operation of the recording and reproducing apparatus will now be summarized taking an example in access to a parameter PRM00 in the first byte of an additional area. It is assumed here that the value in the write sector counter, the value in the read sector counter and the address generated at each point in time are represented by WSC, RSC and $M_{ad}$, respectively. An operation to increment or decrement WSC or RSC by 1 is a process in the adder/subtracter circuit 42 or 43 and a value is obtained by the selection circuit 44 selecting and outputting the output of the adder/subtracter circuit 42 or 43. Further, the operation of (X 940h+OCh) represents a process in the sector address operating unit 45 as described above. The parameter PRM00 is located in a byte corresponding to an offset position 930 in a sector.

1) Methods of generating an address for writing additional data as the parameter PRM00 during recording of sector data read out from a disc into the buffer memory.

a. In the case that during writing into an area in the advance or cyclic mode additional data PRM00 are written into the sector in the preceding area:

$$M_{ad}=(WSC-1)\times 940h+0Ch+930h$$

b. In the case that during writing into an area in the advance or cyclic mode additional data PRM00 are written into the sector in the area:

$$M_{ad}=WSC\times 940h+0Ch+930h$$

c. In the case that during writing into an area in the advance or cyclic mode additional data PRM00 are written into the sector written into the next area:

$$M_{ad}=(WSC+1)\times 940h+0Ch+930h$$

2) Methods of generating an address for reading additional data stored as the parameter PRM00 when sector data are read out from the buffer memory to be output as reproduction data a. In the case that the additional data PRM00 for the sector data in the area succeeding the area being read;

$$M_{ad}=(RSC+1)\times 940h+0Ch+930h$$

b. In the case that the additional data PRM00 for the sector data in the area being read;

$$M_{ad}=(RSC\times 940h+0Ch+930h$$

c. In the case that the additional data PRM00 for the sector data in the area preceding the area being read;

$$M_{ad}=(RSC-1)\times 940h+0Ch+930h$$

The access addresses for parameters PRM01 through PRM33 can be obtained by replacing the added term "930h", i.e., the parameter offset with "931h" through "93Fh".

It goes without saying that it is determined by way of control over the output selection at the selector circuits 44 and 49 performed by the system controller 11 and the control unit 35 which of the above described methods a, b and c is used to generate the address during writing and reading.

With the address counter 34 configured as described above, the system controller 11 does not need to calculate the address of additional data in accessing the data, and the position of an access byte in a sector can be automatically specified as an additional area by simply specifying a parameter offset. The sector in which the additional area is accessed can be specified using a value in the sector counter or a value obtained by incrementing or decrementing the value by 1.

Since the access address of an additional area is obtained using the values in the sector counters, the additional area can be kept in the same area in the buffer memory 13 depending on the sector and, during readout, the additional data corresponding to the sector being read out can be read without the need for management of the relationship between the sectors written in the buffer memory and the respective additional data and the address positions by the system controller 11.

If readout and writing of additional data are always performed on the sector being currently counted, the adder/subtracter circuits 42 and 43 are not necessarily required.

In any case, various kinds of information can be kept in the buffer memory 13 as additional data corresponding to sector data and, in transferring the sector data, the additional data can be read out to be used for various kinds of control.

8. The Operation of Supplying Channel Identification Signals from the Memory Controller to the Decoder A description will now be made with reference to the remaining figures starting with FIG. 12 on the channel identification signals $S_{LR}$ supplied from the memory controller 12 to the encoder/decoder unit 14 in the recording/reproducing apparatus having the above-described configuration.

Figure 12:
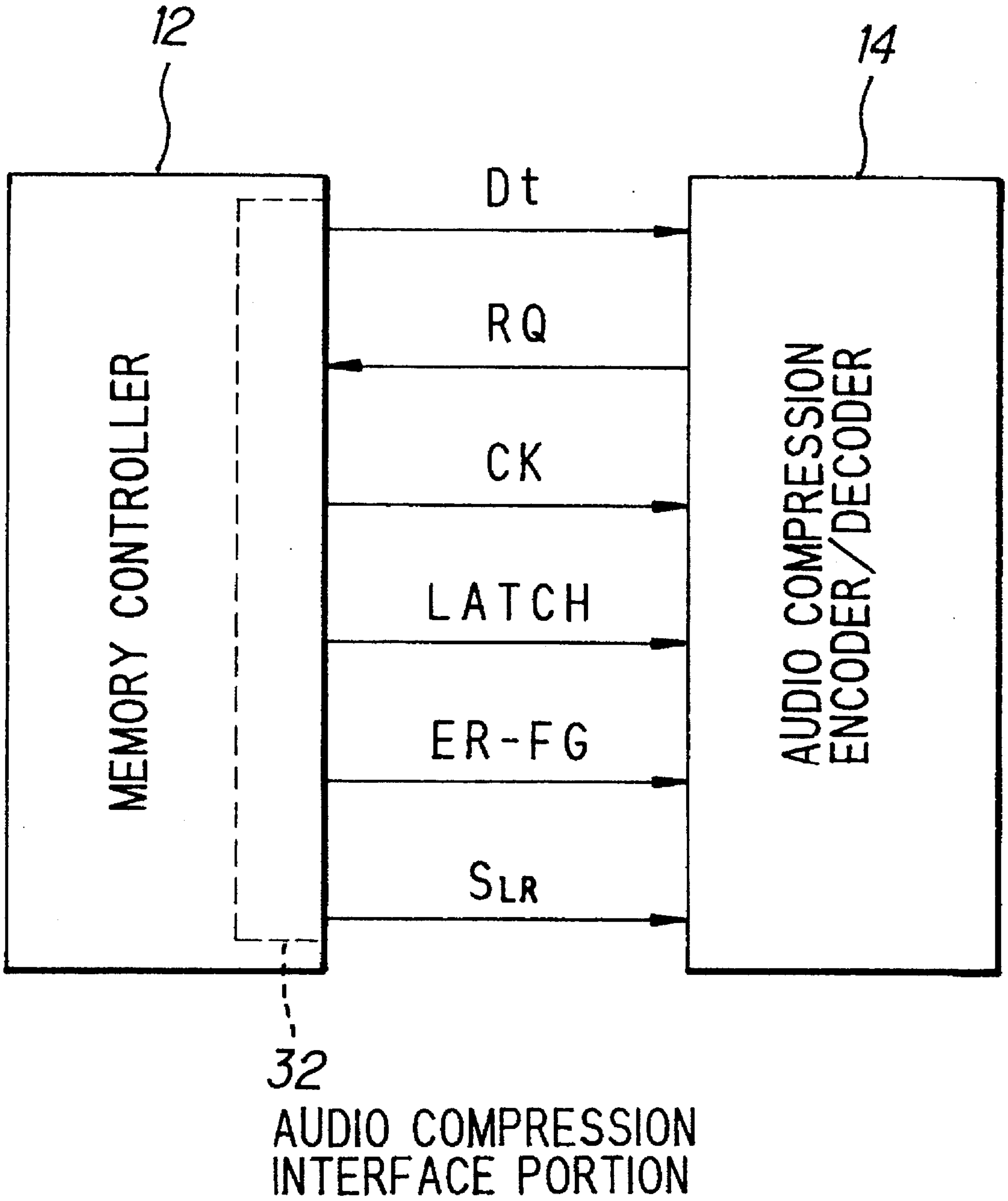
FIG. 12 is a block diagram for explaining input and output signals exchanged between a memory controller and an encoder/decoder unit.

Exchange of signals takes place as shown in FIG. 12 during transfer of sector data read out from the buffer memory 13, i.e., compressed audio data Dt read out from the disc 1 between the audio compression interface unit 32 and the encoder/decoder unit 14.

During reproduction, the encoder/decoder unit 14 fetches the audio data in sound frames and decodes the data into 16-bit digital signals which are output. For this purpose, the encoder/decoder unit 14 outputs request signals RQ for fetching data to the memory controller 12. In response to the request signals RQ, the memory controller 12 outputs the audio data to the encoder/decoder unit in sound frames.

The encoder/decoder unit 14 fetches the supplied audio data Dt in accordance with clocks CK and latch signals LATCH and performs a decoding process.

ER-FG designates an error flag which is a signal indicating whether there is an error in the audio data Dt supplied to the encoder/decoder unit 14 through the memory controller 12. The memory controller 12 outputs channel identification signals $S_{LR}$ to allow the encoder/decoder unit 14 to identify the audio data transferred in sound frames as L-channel data or R-channel data.

Figures 1, 2, 17A, 17B, 17C:
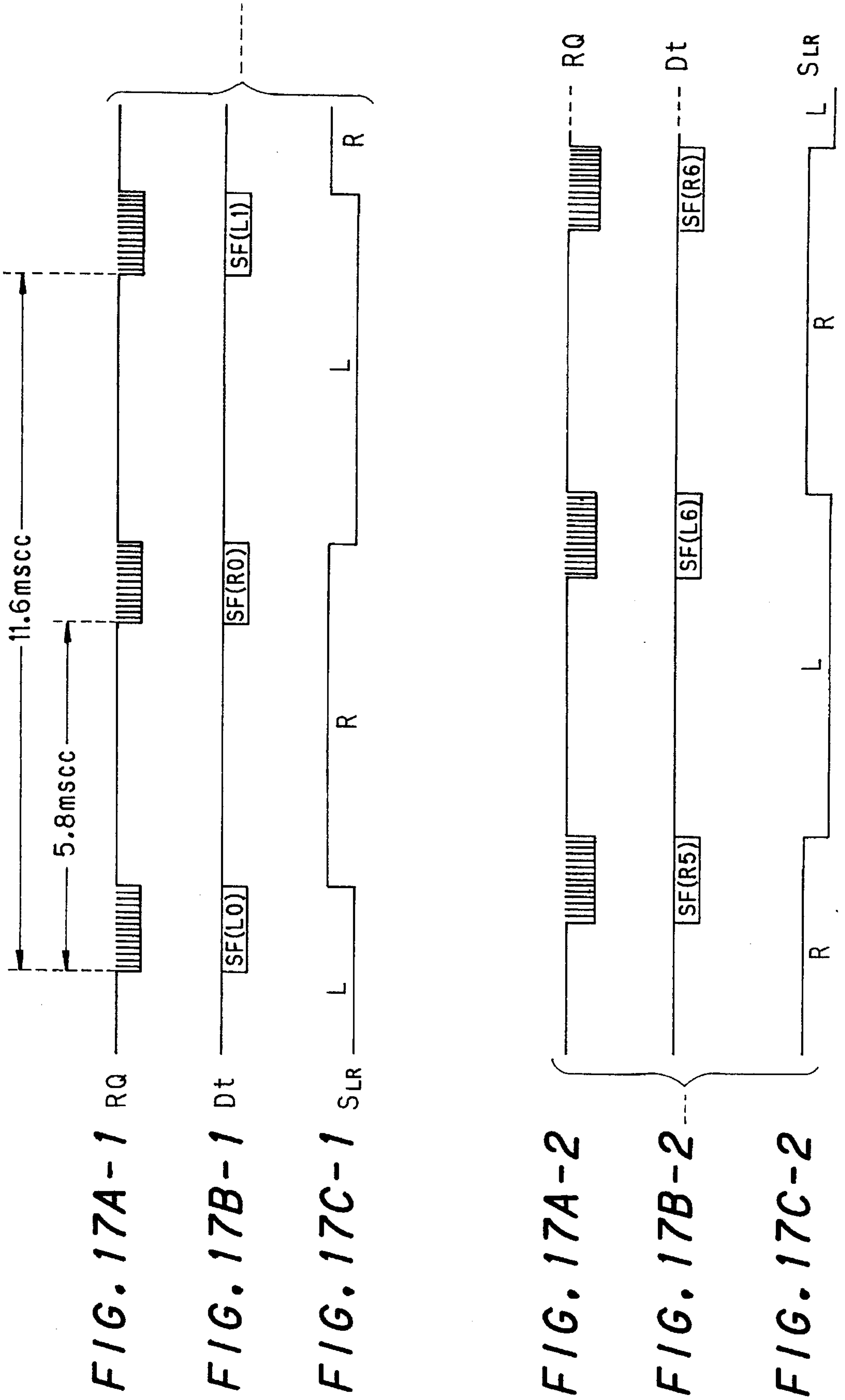

FIG. 13A-1 through FIG. 13C-2 show the request signals RQ, the state of the transfer of the audio data Dt and the channel identification signals $S_{LR}$. FIG. 13A-1 and FIG.

13A-2 show successive request signals RQ in a split form. Similarly, FIG. 13B-1 and FIG. 13B-2 show the audio data and FIG. 13C-1 and FIG. 13C-2 show the channel identification signals $S_{LR}$ in a split form.

As described with reference to FIG. 1A through FIG. 1D, one sound group is audio data which provide L- and R-channel sounds for 11.6 msec. Therefore, the encoder/decoder unit 14 outputs the request signals RQ so that sound frames of the L-channel and sound frames of the R-channel are fetched every 5.8 msec.

The memory controller 12 reads the buffer memory 13 in sectors and supplies the audio data in sound frames in response to the request signals to the encoder/decoder unit 14.

Therefore, in a period corresponding to an even sector, output alternately appears over the L- and R-channels, i.e., the sound frames $SF_{(L0)}$, $SF_{(R0)}$, $SF_{(L1)}$, $SF_{(R1)}$, etc. are output every 5.8 msec as shown in FIG. 13B-1. In the period corresponding to the odd sector succeeding the even sector, the sound frames $SF_{(R5)}$, $SF_{(L6)}$, $SF_{(R6)}$, $SF_{(L7)}$, etc. are output as shown in FIG. 13B-2.

In the present embodiment, the memory controller 12 outputs a channel identification signals SLR once for every two sectors to cause the encoder/decoder unit 14 to identify the sound frame as L-channel data. For example, it outputs a channel identification signal $S_{(LR)}$ as shown in FIG. 13C-1 at the timing for the output of the leading sound frame $SF_{(L0)}$ in an even sector to cause the encoder/decoder unit 14 to recognize that the sound frame is for the L-channel. In the present embodiment wherein a channel identification signal $S_{LR}$ which is a pulse indicating the L-channel is output once for every two sectors. The pulse as the channel identification signal $L_{SR}$ is not output in an odd sector as apparent from the FIG. 13C-2.

Accordingly, the encoder/decoder unit 14 can identify a sound frame fetched when the pulse as the channel identification signal $S_{(LR)}$ is being supplied as the first sound frame $SF_{(L0)}$ of an even sector, i.e., a sound frame of the data in the L-channel. Sound frames fetched thereafter are processed as frames in the R-channel. L-channel, R-channel and so on, which eliminates the possibility of errors in processing and outputting the L- and R-channels.

Even if some error causes two even sectors to be consecutively read out from the buffer memory 13 and, as a result, the L-channel sound frame $SF_{(L5)}$ of one of the even sectors is followed by the L-channel sound frame $SF_{(L6)}$ in transfer, a channel identification signal $S_{LR}$ indicating the L-channel is supplied in correspondence to the sound frame $SF_{(L6)}$. It is therefore possible to prevent this sound frame from being mistaken for an R-channel sound frame, i.e., the first sound frame (R5) of an odd sector during processing.

To output a channel identification signal $S_{LR}$ as a pulse indicating the L-channel, the memory controller 12 must determine whether a sector read out from the buffer memory 13 is an even sector or it is an odd sector.

Figure 14:
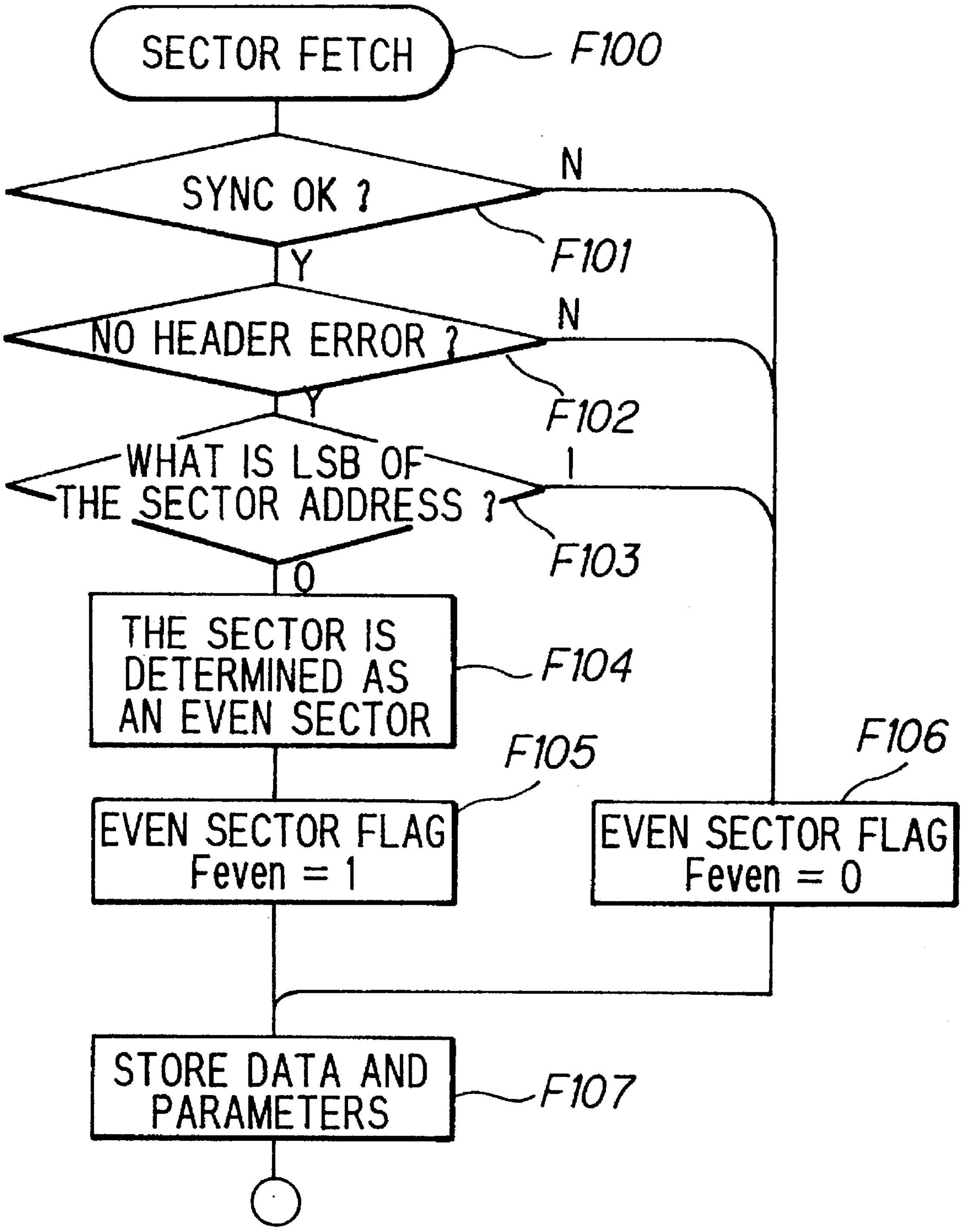
FIG. 14 is a flow chart showing a process during buffer memory readout for determining whether a sector is an even sector or an odd sector performed by a memory controller.
Figure 15:
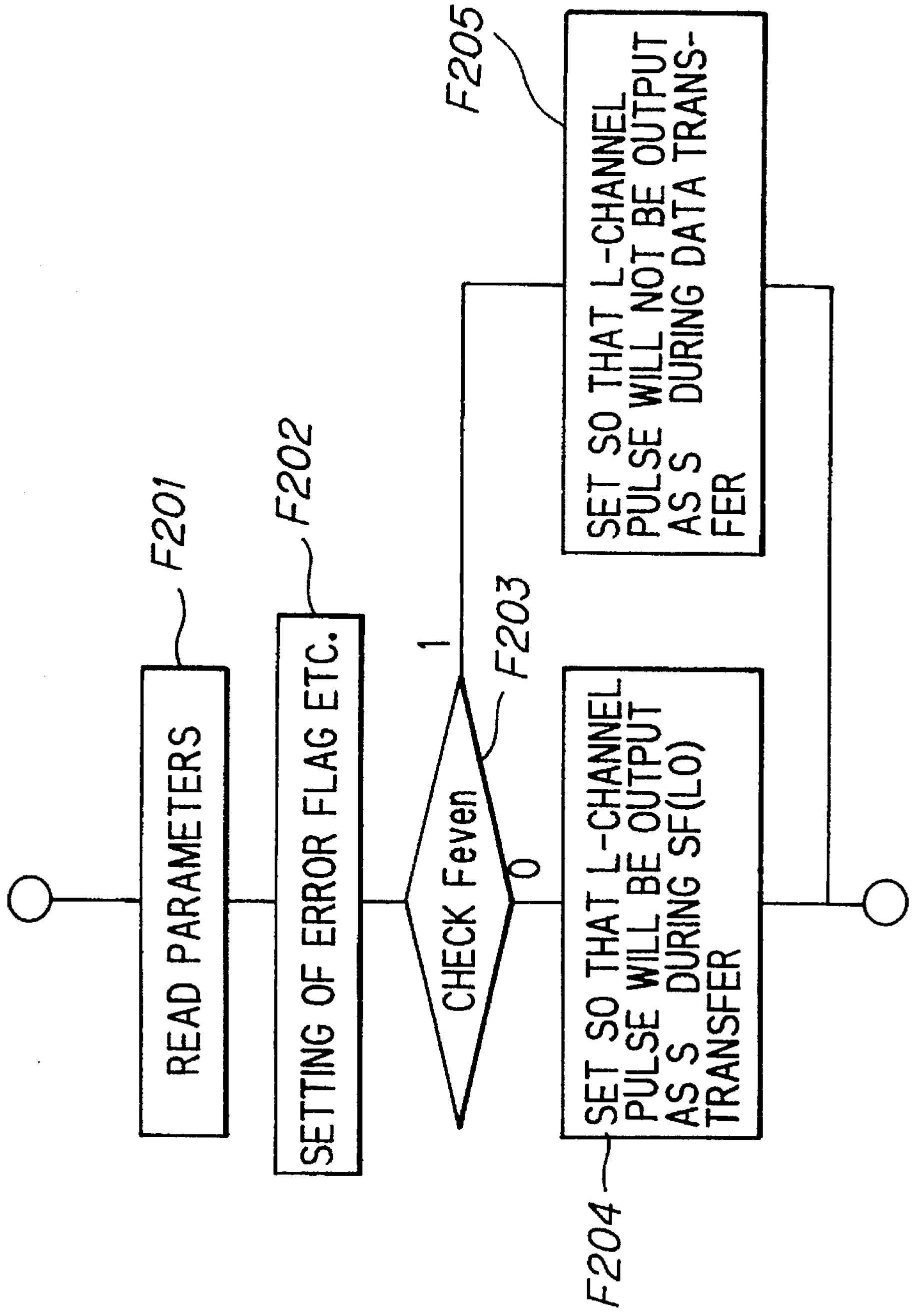
FIG. 15 is a flow chart showing a process during writing into buffer memory for determining whether a sector is an even sector or an odd sector performed by a memory controller.

A process to this purpose is shown in FIG. 14 and FIG. 15.

Data read out from the disc 1 are written by the memory controller 12 into the buffer memory 13 on a sector basis as described above. During this writing into the buffer memory 13, the control unit 35 in the memory controller 12 performs the process as shown in FIG. 14.

When sector data are fetched (F100), the synchronization pattern in the header is detected. If the synchronization pattern is properly obtained, the process proceeds from step F101 to step F102 at which it is determined whether there is an error in the header data or not.

If there is no error in the header data, the sector data have been properly fetched.

When the sector data have been properly fetched, the LSB of the sector address is checked to determine whether the value is "0" or it is "1" (F103). If the LSB of the sector address is "0", the sector is an even sector (F104). Then, an even sector flag $F_{even}$ provided for discrimination between even and odd sectors is set to "0" (F106).

This even sector flag $F_{even}$ is provided as the above-described additional data. When sector data are written into any one of the areas 05 through DC in FIG. 7, this flag is written as one of the parameters (PRM00 though PRM33) in the additional area thereof (any one of $05_{add}$ through $DC_{add}$).

Various other additional data associated with sector data are generated as described above and are written as one of the parameters (PRM00 through PRM 33). Such a process is included in the sector data fetching operation described with reference to FIG. 11.

Since the additional data indicating even and odd sectors associated with sector data are stored in the buffer memory 13 in such a manner, the sector data are properly read and transferred to the encoder/decoder unit 14 by checking the parameter which serves as the even sector flag $F_{even}$ in the data.

Specifically, when the memory controller 12 reads sector data from the buffer memory 13, it can read the additional data associated with the sector data. The timing for reading the additional data can be set in various ways as previously described. In this case, the additional data are read out at a point in time before the transfer of the data in the sector being read. When parameters as the additional data are read in (F201), various settings are made such as error flags depending on the additional data (F202), and the even sector flag $F_{(even)}$ is checked (F203) to generate the channel identification signal $S(_{LR})$.

If the even sector flag $F_{(even)}$ is set to 1, the sector is an even sector. Then, a setting is made so that the pulse indicating the L-channel is output as the channel identification signal $S(_{LR})$ in synchronism with the timing at which the leading sound frame $SF_{(L0)}$ of the data in the sector is transferred (F204).

On the other hand, if the even sector flag $F_{(even)}$ is set to 0, the sector is an odd sector. In this case, a setting is made so that the pulse indicating the L-channel is not output as the channel identification signal $S_{(LR)}$ when the data in the sector are transferred (F205).

The operation of the control unit 35 as described above causes the pulse of the channel identification signal $S_{(LR)}$ to be output normally once for every two sectors as shown in FIG. 13 to allow the encoder/decoder unit 14 to check whether the supplied data are for the L-channel or for the R-channel.

The process shown in FIG. 14 and FIG. 15 can be carried out not only in the control unit 35 of the memory controller 12 by means of a hardware logic circuit but also, for example, in the system controller 11 using a software operation means.

9. Alternative Embodiments of the Channel Identification Signal

Figures 16A, 16B, 16C, 16D, 16E, 16F, 16G:
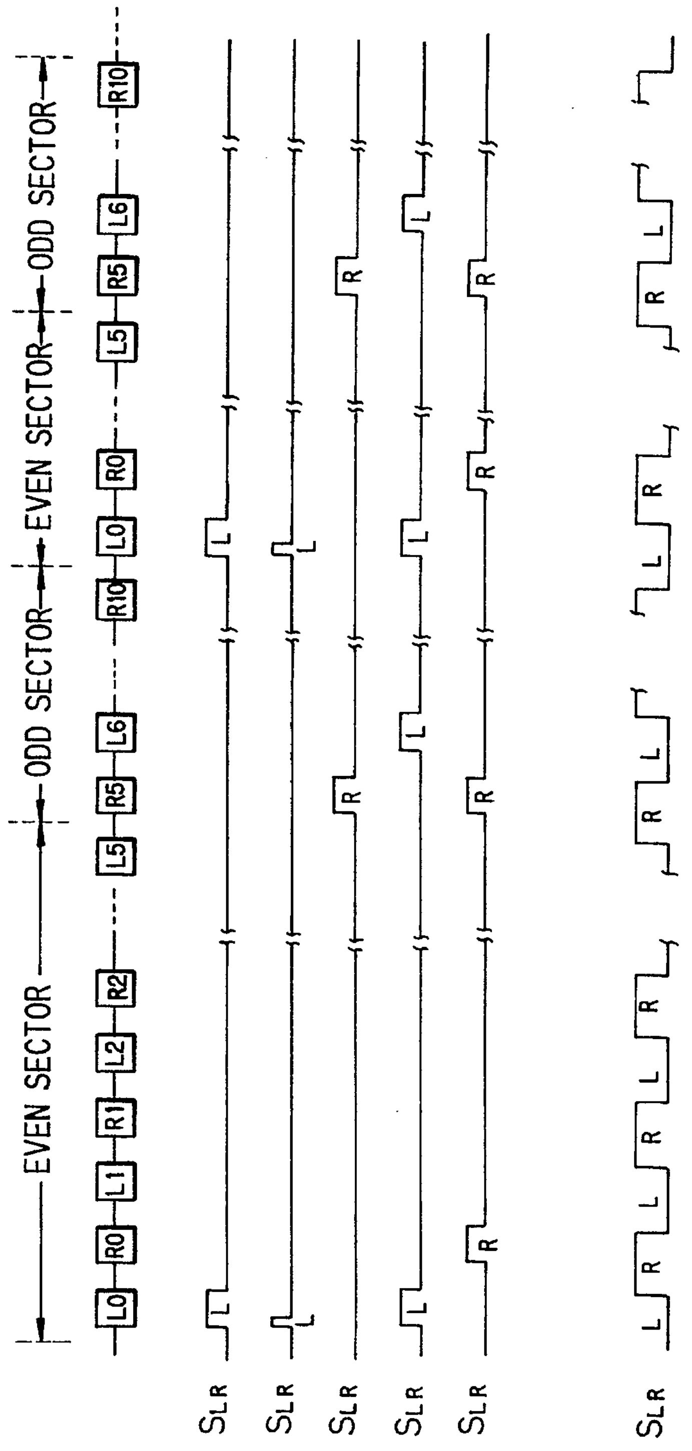
FIG. 16A through FIG. 16G are waveform diagrams showing various kinds of channel identification signals as modifications to the present invention.

The channel identification signal $S_{(LR)}$ can be output in various ways as shown in FIG. 16A through FIG. 16G other than outputting it as a pulse associated with the sound frame $SF_{(L0)}$ as described above. FIG. 16A shows the timing at which sound frames in four sectors are transferred. FIG. 16B shows the channel identification signal $S_{(LR)}$ in the above-described embodiment.

FIG. 16C shows a modification to that shown in FIG. 16A wherein the pulse width has been changed. Specifically, the channel identification signal $S_{LR)}$ in the foregoing embodiment is a signal having a pulse width such that it is at a high level during the transfer period of the sound frame $SF_{(L0)}$. However, this is not essential and a pulse as shown in FIG. 16C may be used to indicate that the sound frame $SF_{(L0)}$ is in the L-channel.

FIG. 16D shows an example wherein the channel identification signal $S_{(LR)}$ is a pulse indicating the R-channel which is output in correspondence to the first sound frame $SF_{(R5)}$ of an odd sector.

FIG. 16E shows an example wherein an L-channel identification pulse is output for each sector as the channel identification signal $S_{(LR)}$, the pulse being output during the periods corresponding to the sound frames $SF_{(L0)}$ and $SF_{(L6)}$.

FIG. 16F shows an example wherein an R-channel identification pulse is output for each sector as the channel identification signal $S_{(LR)}$, the pulse being output during the periods corresponding to the sound frames $SF_{(R0)}$ and $SF_{(R6)}$.

When the channel identification signal is generated as pulses for identifying the L- or R-channel as described above, various alternatives to those shown in FIG. 16B through FIG. 16F may be contemplated with regard to output timing which determines the number of sectors in the interval between two such pulses or the sound frames to correspond to the output of such pulses.

FIG. 16G shows an example wherein the channel identification signal $S_{(LR)}$ is not a pulse corresponding to a particular sound frame of the L- or R-channel as described above but is output in correspondence to each sound frame as a channel clock for the L- and R-channels.

The output waveform of the embodiment wherein the channel identification signal $S(_{LR)}$ is a channel clock is shown in FIG. 17A-1 through. FIG. 17C-2 in the same way as in FIG. 13.

In this case, the channel identification signal $S_{(LR)}$ is a clock which is inverted when transfer of each sound frame is completed as apparent from FIG. 17A-1 through FIG. 17C-2. Therefore, the encoder/decoder unit 14 can recognize that it is supplied with the R-channel sound frames $SF_{(R0)}$, $SF_{(R1)}$, $SF_{(R2)}$ and so on during the R-periods of this channel identification signal $S_{(LR)}$ and L-channel sound frames $SF_{(L0)}$, $SF_{(L1)}$, $SF_{(L2)}$ and so on during the L-periods of this channel identification signal $S_{LR}$. Thus, errors in processing L- and R-channels can be avoided.

Figures 18A, 18B:
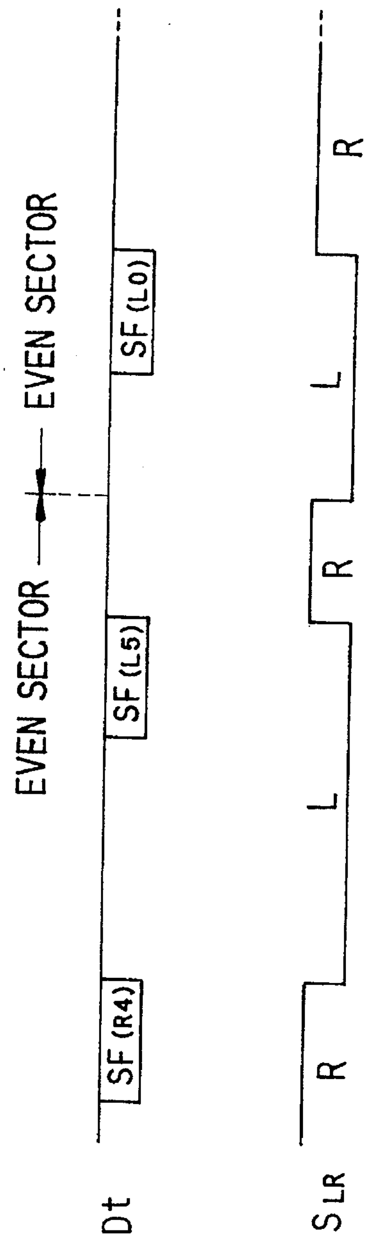
FIG. 18A and FIG. 18B illustrate channel identification signals as L- and R-channel clocks in another embodiment of the present invention.

Assume that there is an error such that data of two even sectors are consecutively output as shown in FIG. 18A with such an arrangement. That is a case such that, for example, the sound frame $SF_{(L0)}$ is transferred to the encoder/decoder unit 15 following the sound frame $SF_{(L5)}$.

However, the memory controller 12 determines whether a sector is an even sector or an odd sector, for, example, according to the manner described above and sets the channel identification signal $S_{(LR)}$ as the L/R clock so that it is in an L-channel period at the beginning of an even sector. As a result, the channel identification signal $S_{(LR)}$ is output as shown in FIG. 18B. According to this channel identification signal $S_{(LR)}$, the encoder/decoder unit 14 can exactly identify the sound frame data which has fetched as data in the L- or R-channel to perform decoding. This eliminates the possibility that the L- and R-channels are reversed in reproduced audio output resulting in phase shifts in stereo sounds.

Although the embodiment has been described as an example of the application of the invention to a recording and reproducing apparatus for a magneto-optical disc 1, it goes without saying that the application can be extended to a reproduction-only apparatus.

There may be various alternatives for the method of generating the channel identification signal and the waveform of the channel identification signal. The channel identification signal may be generated and output by the system controller 11 or the like instead of outputting it from the memory controller 12.

While the present invention has been shown and described with reference to the foregoing operational principles and preferred embodiment, it will be apparent to those skilled in the art that other changes in form and detail may be made therein without departing from the spirit and scope of the invention as defined in the appended claims.

What is claimed is:

1. An apparatus for reproducing data stored on a recording medium, the apparatus comprising:

reading means for reading the data stored on the recording medium to form a reproduced stream of data comprised of a plurality of interleaved channels of data, each channel of data representing a type of data;

memory means for temporarily storing the reproduced stream of data read by the reading means; and decoding means for expanding the reproduced stream of data temporarily stored in the memory means, wherein when the reproduced stream of data is supplied from said memory means to said decoding means, said decoding means is periodically supplied with a channel identification signal that identifies the type of data in a channel of data from the plurality of interleaved channels associated with the reproduced stream of data received by said decoding means.

2. The reproducing apparatus according to claim 1, wherein the data recorded on the recording medium includes audio data, wherein the type of data in the plurality of interleaved channels of data include an L-channel of data and an R-channel of data, and wherein the channel identification signal includes a pulse which is substantially in synchronism with the channel of data, and which indicates that the channel of data represents the L-channel or the R-channel.

3. The reproducing apparatus according to claim 1, wherein the data recorded on the recording medium includes audio data;

wherein the type of data in the plurality of interleaved channels of data include an L-channel of data and an R-channel of data, and wherein the channel identification signal includes an L/R clock pulse which is substantially in synchronism with the plurality of interleaved channels of the reproduced stream of data transferred from said memory means to said decoding means, and which identifies each channel of data supplied to said decoding means.

4. An apparatus for reproducing compressed data stored on a recording medium, the apparatus comprising:

a head device for intermittently reading the data stored on the recording medium to form a stream of compressed output data having a plurality of interleaved channels of data, each channel of data representing a type of data;

a demodulator for demodulating the stream of compressed output data to form a stream of demodulated compressed output data having a plurality of interleaved channels of data;

a memory that temporarily stores the stream of demodulated compressed output data;

a memory controller for writing the stream of demodulated compressed output data into said memory in a predetermined unit, for reading out the stream of demodulated compressed output data stored in said memory in said predetermined unit, and for controlling said memory so that the stream of demodulated compressed output data is written into said memory at a transfer rate which is higher than the transfer rate at which the stream of demodulated compressed output data stored in said memory is read out; and a decoder that decompresses the stream of demodulated compressed output data read out of the memory, wherein the stream of demodulated compressed output data stored in said memory are alternately read out from the memory as an L-channel type of data and an R-channel type of data, and wherein said decoder is periodically supplied with a channel identification signal that identifies the type of data in a channel of data of the plurality of interleaved channels associated with the stream of demodulated compressed output data supplied by said memory.

5. The reproducing apparatus according to claim 4, wherein said predetermined unit includes a plurality of sectors, and wherein when said predetermined unit is read out from said memory, said memory controller outputs said channel identification signal at a rate of once for every two sectors.

6. The reproducing apparatus according to claim 4, wherein said predetermined unit includes a plurality of sectors, wherein each sector includes a plurality of L-channels and R-channels, and wherein when said predetermined unit is read out from said memory, said memory controller outputs said channel identification signal indicating data in an L-channel at a rate of once for every two sectors.

7. The reproducing apparatus according to claim 6, wherein said channel identification signal is output at a rate of once for every sector.

8. An apparatus for reproducing data stored on a recording medium, the apparatus comprising:

reading means for intermittently reading digital data in at least two channels recorded on the recording medium to form output data, the output data having a plurality of interleaved channels;

a memory that temporarily stores the output data;

a memory controller that controls said reading means based on a level of the output data stored in said memory, transfers the output data into said memory from the reading means, and transfers the output data from said memory so that the output data are written into said memory at a transfer rate which is higher than the transfer rate at which the output data stored in said memory are read out; and a decoder that expands the output data read out of the memory, wherein when said output data are supplied from said memory to said decoder, said memory controller supplies said decoder with a channel identification signal that identifies the channel associated with the output data received by said decoder.

9. The reproducing apparatus according to claim 8, wherein said memory controller outputs said channel identification signal timing at which the leading portion of the data in in synchronism with a channel of the plurality of channels.

10. The reproducing apparatus according to claim 9, wherein said memory controller outputs said channel identification signal to indicate an L-channel as the leading channel.

11. A method for reproducing data stored on a recording medium, the data being stored as a plurality of interleaved channels, the method comprising the steps of:

reading the data stored on the recording medium to form output data, the output data having a plurality of interleaved channels;

temporarily storing the output data read by the reading means;

expanding the output data temporarily stored in the memory means; and identifying a channel of the plurality of interleaved channels associated with the output data.

* * * * *